(12) United States Patent
Fukuda et al.

(10) Patent No.: US 11,909,892 B2
(45) Date of Patent: Feb. 20, 2024

(54) AUTHENTICATION SYSTEM, CLIENT, AND SERVER

(71) Applicant: NEC Corporation, Tokyo (JP)

(72) Inventors: Haruna Fukuda, Tokyo (JP); Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 274 days.

(21) Appl. No.: 17/311,475

(22) PCT Filed: Dec. 12, 2018

(86) PCT No.: PCT/JP2018/045777
§ 371 (c)(1),
(2) Date: Jun. 7, 2021

(87) PCT Pub. No.: WO2020/121459
PCT Pub. Date: Jun. 18, 2020

(65) Prior Publication Data
US 2022/0029829 A1    Jan. 27, 2022

(51) Int. Cl.
*H04L 9/32* (2006.01)

(52) U.S. Cl.
CPC .................. *H04L 9/3263* (2013.01)

(58) Field of Classification Search
None
See application file for complete search history.

(56) References Cited

U.S. PATENT DOCUMENTS

| 2002/0104006 A1 | 8/2002 | Boate et al. |
| 2010/0242102 A1 | 9/2010 | Cross et al. |
| 2011/0179284 A1* | 7/2011 | Suzuki ................. G06F 21/32 713/186 |
| 2012/0207299 A1 | 8/2012 | Hattori et al. |

(Continued)

FOREIGN PATENT DOCUMENTS

| JP | 2001216270 A | 8/2001 |
| JP | 2004518229 A | 6/2004 |

(Continued)

OTHER PUBLICATIONS

International Search Report of PCT Application No. PCT/JP2018/045777 dated Mar. 19, 2019.

(Continued)

*Primary Examiner* — Brandon Hoffman

(57) ABSTRACT

Provided is an authentication system capable of preventing determination that authentication of a person to be authenticated succeeds even though determination as to whether matching information matches registration information is not performed when authentication using two factors is performed. A determination unit 43 determines whether or not the matching information matches the registration information. A signature generation unit 21 of a client 10 generates a signature based on the message by using a signature key. A signature determination unit 34 determines whether or not the signature is a correct signature by using a first verification key, a message, and the signature. When it is determined that the matching information matches the registration information and it is determined that the signature is the correct signature, the authentication determination unit 37 determines that the authentication succeeds.

8 Claims, 10 Drawing Sheets

(56) References Cited

U.S. PATENT DOCUMENTS

2013/0246281 A1*  9/2013  Yamada .................. G06F 21/32
                                                      705/71
2015/0012742 A1    1/2015  Gorelik et al.
2017/0366525 A1*  12/2017  Takagi ................ H04L 63/0435

FOREIGN PATENT DOCUMENTS

| JP | 2010505286 A | 2/2010 |
| JP | 2014164359 A | 9/2014 |
| JP | 2017152880 A | 8/2017 |
| WO | 2011052056 A1 | 5/2011 |

OTHER PUBLICATIONS

English translation of Written opinion for PCT Application No. PCT/JP2018/045777 dated Mar. 19, 2019.

* cited by examiner

AUTHENTICATION SYSTEM, CLIENT, AND SERVER

This application is a National Stage Entry of PCT/JP2018/045777 filed on Dec. 12, 2018, the contents of all of which are incorporated herein by reference, in their entirety.

TECHNICAL FIELD

The present invention relates to an authentication system, an authentication method, and a client, a server, a client program, and a server program applied to the authentication system.

BACKGROUND ART

An example of authentication means is biometric authentication. The "biometric authentication" is a method of personal authentication for confirming whether or not a registered person is a person to be authenticated by matching biometric information of the registered person with biometric information of the person to be authenticated.

The "biometric information" is data extracted from a feature of a part of an individual regarding a body or an action, or data generated by converting the extracted data. This data may be referred to as a feature value.

A "template" is data generated from the biometric information (hereinafter, referred to as registration information.) of the registered person stored in advance for the biometric authentication.

As a specification of an authentication method of determining whether or not matching information input for matching with the registration information matches the registration information, generating a response based on a challenge-response method in a client, and performing authentication by using this response in a server when it is determined that the matching information matches the registration information, there is Fast Identity Online (FIDO). FIDO is described in, for example, PTL 1.

It can be said that FIDO is authentication performs verification regarding biometric information and verification regarding possession of a signature key. That is, FIDO is two-factor authentication.

CITATION LIST

Patent Literature

PTL 1: Japanese Patent Laid-Open No. 2017-152880

SUMMARY OF INVENTION

Technical Problem

In two-factor authentication such as FIDO, despite the fact that the client does not actually determine whether or not the matching information matches the registration information, the server may determine that the authentication of the person to be authenticated succeeds.

It is preferable that such a problem can be prevented in two-factor authentication even factors other than a living body are used.

Therefore, an object of the present invention is to provide an authentication system, an authentication method, and a client, a server, a client program, and a server program which are applied to the authentication system capable of preventing determination that authentication of a person to be authenticated succeeds even though determination as to whether matching information matches registration information is not performed when authentication using two factors is performed.

Solution to Problem

An authentication system according to the present invention is an authentication system including a client. The system includes a determination unit that determines whether or not matching information matches registration information based on a concealed evaluation value of an evaluation value indicating similarity between the registration information and the matching information, the concealed evaluation value being calculated by the client, a message transmission unit that transmits a message to the client, a signature determination unit that determines whether or not a signature generated by the client is a correct signature by using a first verification key, the message, and the signature, and an authentication determination unit that determines that authentication succeeds when it is determined that the matching information matches the registration information and it is determined that the signature is the correct signature. The client 35 includes a concealed information storage unit that stores concealed information obtained by concealing the registration information, a concealed evaluation value calculation unit that calculates the concealed evaluation value based on the matching information and the concealed information, and a signature generation unit that generates the signature based on the message by using a signature key.

A client according to the present invention includes a concealed information storage unit that stores concealed information obtained by concealing registration information, a concealed evaluation value calculation unit that calculates a concealed evaluation value of an evaluation value indicating similarity between the registration information and matching information based on the matching information input for matching with the registration information and the concealed information, a signature generation unit that generates a signature based on a given message by using a signature key when the server determines that the matching information matches the registration information based on the concealed evaluation value, and a signature output unit that outputs a certificate generated by the server when the server determines that the matching information matches the registration information and the signature.

A server according to the present invention includes a determination unit that determines whether or not matching information matches registration information based on a concealed evaluation value of an evaluation value indicating similarity between the registration information and the matching information, the concealed evaluation value being calculated by a client, and a certificate generation unit that generates a certificate by using a certification key when it is determined that the matching information matches the registration information.

A server according to the present invention includes a message transmission unit that transmits a message to a client, a signature determination unit that acquires a signature generated by the client based on the message by using a signature key when it is determined that matching information matches registration information, and determines whether or not the signature is a correct signature by using a first verification key, the message, and the signature, a certificate determination unit that acquires a certificate generated by using a certification key when it is determined that the matching information matches the registration information, and determines whether or not the certificate is a correct certificate by using a second verification key and the certificate, and an authentication determination unit that determines that authentication succeeds when it is determined that the certificate is the correct certificate and it is determined that the signature is the correct signature.

A server according to the present invention includes a determination unit that determines whether or not matching information matches registration information based on a concealed evaluation value of an evaluation value indicating similarity between the registration information and the matching information, the concealed evaluation value being calculated by a client, a message transmission unit that transmits a message to the client, a signature determination unit that acquires a signature generated by the client based on the message by using a signature key when it is determined that the matching information matches the registration information, and determines whether or not the signature is a correct signature by using a verification key, the message, and the signature, and an authentication determination unit that determines that authentication succeeds when it is determined that the matching information matches the registration information and it is determined that the signature is the correct signature.

A server according to the present invention includes a determination unit that determines whether or not matching information matches registration information based on a concealed evaluation value of an evaluation value indicating similarity between the registration information and the matching information, the concealed evaluation value being calculated by a client, and a signature transmission unit that transmits a signature generated by the client based on a message given from a predetermined server to the predetermined server under a condition that the matching information and the registration information are determined to match.

An authentication method according to the present invention includes calculating, by a client that includes a concealed information storage unit storing concealed information obtained by concealing registration information, a concealed evaluation value of an evaluation value indicating similarity between the registration information and matching information based on the matching information input for matching with the registration information and the concealed information, determining, by a predetermined server, whether or not the matching information matches the registration information based on the concealed evaluation value, transmitting, by the predetermined server or a server different from the predetermined server, a message to the client, generating, by the client, a signature based on the message by using a signature key when it is determined that the matching information matches the registration information, determining, by the predetermined server or the server different from the predetermined server, whether or not the signature is a correct signature by using a first verification key, the message, and the signature, and determining, by the predetermined server or the server different from the predetermined server, that authentication succeeds when it is determined that the matching information matches the registration information and it is determined that the signature is the correct signature.

A client program according to the present invention is a client program installed on a computer that includes a concealed information storage unit storing concealed information obtained by concealing registration information and operates as a client. The client program causing the computer to execute concealed evaluation value calculation processing of calculating a concealed evaluation value of an evaluation value indicating similarity between the registration information and matching information based on the matching information input for matching with the registration information and the concealed information, signature generation processing of generating a signature based on a given message by using a signature key when a server determines that the matching information matches the registration information based on the concealed evaluation value, and signature output processing of outputting a certificate generated by the server when the server determines that the matching information matches the registration information and the signature.

A server program according to the present invention is a server program installed on a computer operating as a server. the server program causing the computer to execute determination processing of determining whether or not matching information matches registration information based on a concealed evaluation value of an evaluation value indicating similarity between the registration information and the matching information, the concealed evaluation value being calculated by a client, and certificate generation processing of generating a certificate by using a certification key when it is determined that the matching information matches the registration information.

A server program according to the present invention is a server program installed on a computer operating as a server. The server program causing the computer to execute transmission processing of transmitting a message to a client, signature determination processing of acquiring a signature generated by the client based on the message by using a signature key when it is determined that matching information matches registration information, and determining whether or not the signature is a correct signature by using a first verification key, the message, and the signature, certificate determination processing of acquiring a certificate generated by using a certification key when it is determined that the matching information matches the registration information, and determining whether or not the certificate is a correct certificate by using a second verification key and the certificate, and authentication determination processing of determining that authentication succeeds when it is determined that the certificate is the correct certificate and it is determined that the signature is the correct signature.

A server program according to the present invention is a server program installed on a computer operating as a server. the server program causing the computer to execute determination processing of determining whether or not matching information matches registration information based on a concealed evaluation value of an evaluation value indicating similarity between the registration information and the matching information, the concealed evaluation value being calculated by a client, message transmission processing of transmitting a message to the client, signature determination processing of acquiring a signature generated by the client by using a signature key based on the message when it is determined that the matching information matches the registration information, and determining whether or not the signature is a correct signature by using a verification key, the message, and the signature, and authentication determination processing of determining that authentication succeeds when it is determined that the matching information matches the registration information and it is determined that the signature is the correct signature.

A server program according to the present invention is a server program installed on a computer operating as a server.

The server program causing the computer to execute determination processing of determining whether or not matching information matches registration information based on a concealed evaluation value of an evaluation value indicating similarity between the registration information and the matching information, the concealed evaluation value being calculated by a client, and signature transmission processing of transmitting a signature generated by the client based on a message given from a predetermined server to the predetermined server under a condition that the matching information and the registration information are determined to match.

Advantageous Effects of Invention

According to the present invention, it is possible to prevent the determination that the authentication of the person to be authenticated succeeds even though the determination as to whether the matching information matches the registration information is not performed when the authentication using the two factors are performed.

DESCRIPTION OF EMBODIMENTS

Hereinafter, exemplary embodiments of the present invention will be described with reference to the drawings. In the following exemplary embodiments, a case where an authentication system according to the present invention is applied to biometric authentication will be described as an example. However, the authentication system according to the present invention may be applied to authentication other than biometric authentication.

First, FIDO will be described more specifically.

Figure 1:
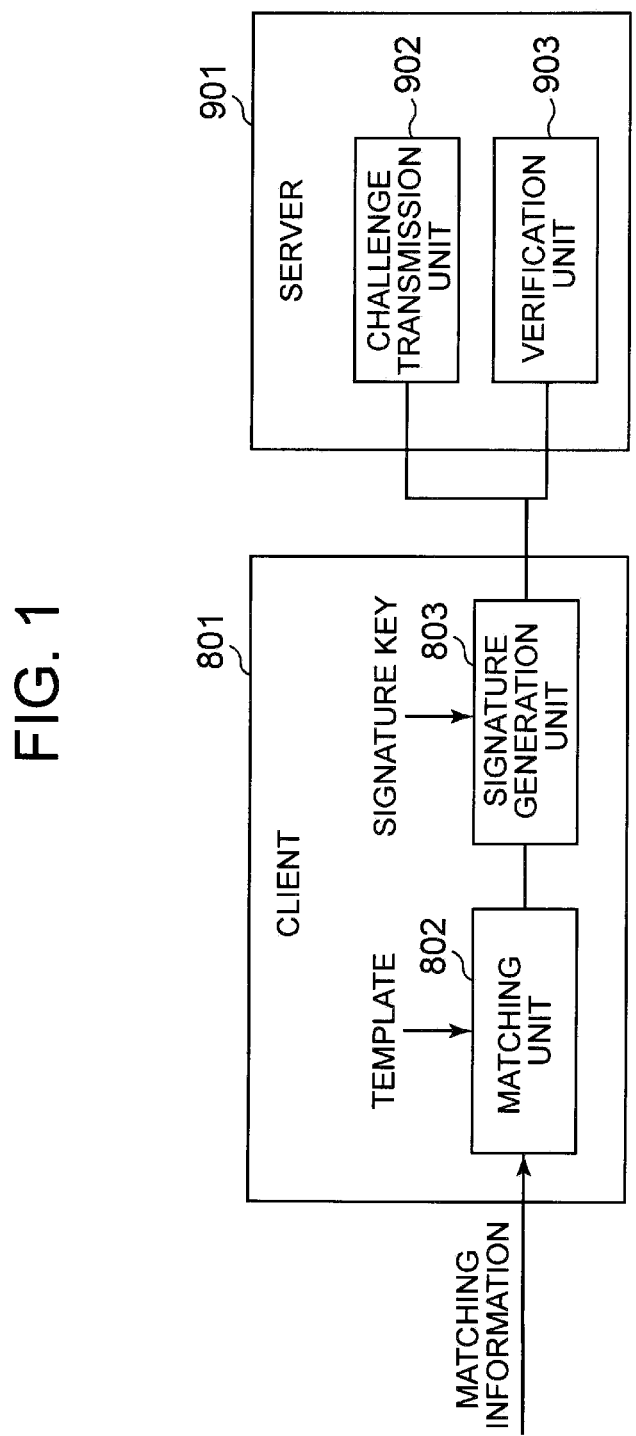
FIG. 1 It depicts a schematic diagram illustrating an example of a client server system to which FIDO is applied.

FIG. 1 is a schematic diagram illustrating an example of a client server system to which FIDO is applied. A system illustrated in FIG. 1 includes a client 801 and a server 901. The client 801 includes a matching unit 802 and a signature generation unit 803. The server 901 includes a challenge transmission unit 902 and a verification unit 903.

The matching unit 802 determines whether or not registration information matches matching information input to the client 801 by using a template retained in the client 801 in advance. When the matching information does not match the registration information, processing is ended. When it is determined that the matching information matches the registration information, the signature generation unit 803 generates a signature based on a challenge of a challenge-response method by using a signature key retained in the client 801 in advance. The challenge is transmitted to the client 801 by the challenge transmission unit 902.

The client 801 transmits, as a response, the generated signature to the server 901. The verification unit 903 verifies the signature by using a verification key retained in the server 901, a message transmitted to the client 801, and the signature received from the client 801. Specifically, the verification unit 903 determines whether or not the signature is generated by the signature key paired with the verification key retained in the server 901 based on the message transmitted by the server 901. Hereinafter, a signature generated by the signature key paired with the verification key retained in the server based on the message transmitted by the server is referred to as a correct signature. A signature that does not correspond to the correct signature is referred to as an unauthorized signature. The verification unit 903 determines that the authentication of a person to be authenticated succeeds when it is determined that the signature is the correct signature, and determines that the authentication of the person to be authenticated fails when it is determined that the signature is the unauthorized signature.

As described above, in FIDO, the client 801 determines whether or not the matching information matches the registration information. When it is determined that the matching information matches the registration information, the server 901 determines whether or not the signature generated in the client 801 is the correct signature.

Figure 2:
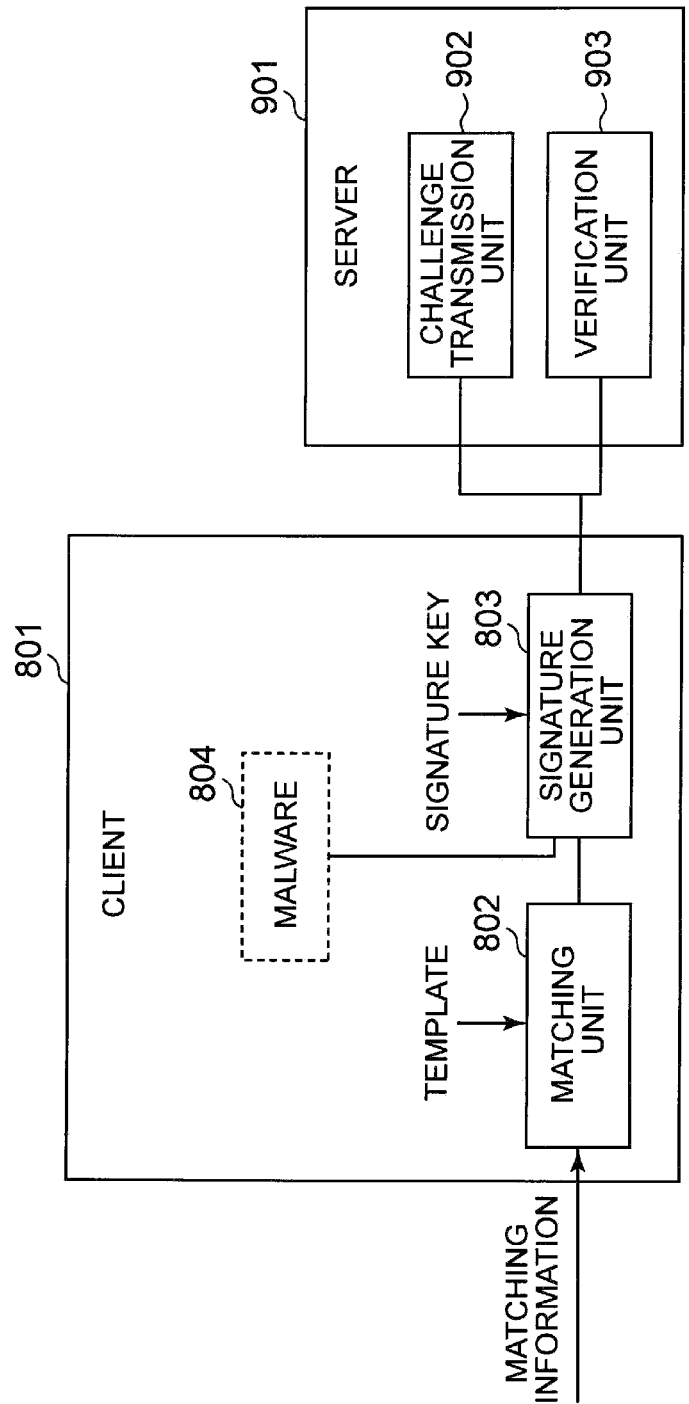
FIG. 2 It depicts a schematic diagram illustrating problems of the system illustrated in FIG. 1.

The system illustrated in FIG. 1 has the following problems. FIG. 2 is a schematic diagram illustrating the problems of the system illustrated in FIG. 1. As illustrated in FIG. 2, the client 801 may include malware 804 (alternatively, unauthorized application software). Even though the matching unit 802 does not determine whether or not the matching information matches the registration information, when the malware 804 gives, to the signature generation unit 803, information indicating that the matching information and the registration information are determined to match, the signature generation unit 803 generates the signature, and the verification unit 903 of the server 901 may determine that the authentication of the person to be authenticated succeeds. That is, even though the client 801 does not actually determine whether or not the matching information matches the registration information, the server 901 may determine that the authentication of the person to be authenticated succeeds.

The present invention solves such a problem. Hereinafter, the exemplary embodiments of the present invention will be described.

First Exemplary Embodiment

Figure 3:
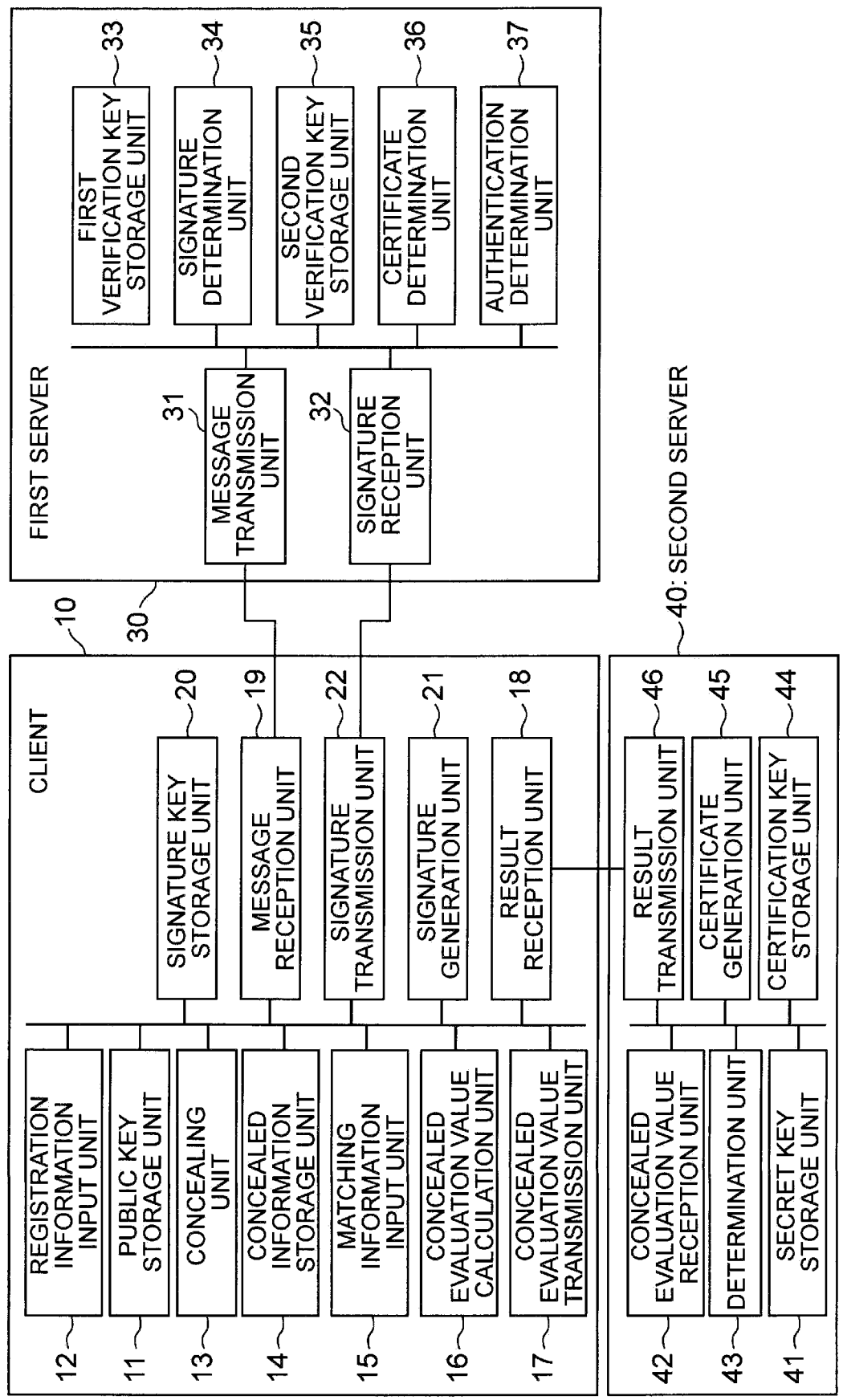
FIG. 3 It depicts a block diagram illustrating a configuration example of an authentication system according to a first exemplary embodiment of the present invention.

FIG. 3 is a block diagram illustrating a configuration example of the authentication system according to the first exemplary embodiment of the present invention. The authentication system includes a client 10, a first server 30, and a second server 40. Although FIG. 3 illustrates one client 10, there may be a plurality of clients 10. The client 10, the first server 30, and the second server 40 can communicate via a communication network.

The client 10 includes a public key storage unit 11, a registration information input unit 12, a concealing unit 13, a concealed information storage unit 14, a matching information input unit 15, a concealed evaluation value calculation unit 16, a concealed evaluation value transmission unit 17, a result reception unit 18, a message reception unit 19, a signature key storage unit 20, a signature generation unit 21, and a signature transmission unit 22.

The first server 30 includes a message transmission unit 31, a signature reception unit 32, a first verification key storage unit 33, a signature determination unit 34, a second verification key storage unit 35, a certificate determination unit 36, and an authentication determination unit 37.

The second server 40 includes a secret key storage unit 41, a concealed evaluation value reception unit 42, a determination unit 43, a certification key storage unit 44, a certificate generation unit 45, and a result transmission unit 46.

The public key storage unit 11 is a storage device that stores a public key (denoted by pk.) generated by the second server 40 and transmitted by the second server 40.

Although not illustrated, the second server 40 includes means for generating the public key pk and a secret key (denoted by sk.). Concealment of data with the public key pk can be canceled with the secret key sk. The client 10 may receive the public key from the second server 40 and store the received public key in the public key storage unit 11. The second server 40 stores the secret key sk in the secret key storage unit 41. However, the public key pk and the secret key sk may be generated by a device other than the second server 40.

The registration information input unit 12 receives an input of the registration information. In each exemplary embodiment, biometric information of a registered person is input, as registration information, to the registration information input unit 12.

In each exemplary embodiment, a case where the registration information and the matching information input for matching with the registration information are represented by common dimensional vectors will be described as an example.

The registration information input unit 12 may be any input device corresponding to the registration information. For example, when biometric information extracted from a fingerprint is used as the registration information, the registration information input unit 12 may be an input device that reads the fingerprint, extracts a vector to be the registration information from the fingerprint, and receives an input of the vector. The registration information input unit 12 may be an input device to which the vector serving as the registration information is directly input.

The biometric information may be extracted from an iris, a retina, a face, a blood vessel (vein), a palm print, a voiceprint, or a combination thereof, in addition to the fingerprint. The biometric information may be extracted from other information capable of identifying the living body other than the above-described examples.

The vector corresponding to the biometric information (registration information) of the registered person input to the registration information input unit 12 is referred to as X.

The concealing unit 13 conceals the biometric information X of the registered person input to the registration information input unit 12, and stores information obtained by concealing the biometric information X (referred to as concealed information.) in the concealed information storage unit 14. The concealed information storage unit 14 is a storage device that stores the concealed information.

The concealed information is data generated from the biometric information of the registered person stored in advance for biometric authentication. Accordingly, the concealed information is a template. Since the public key pk stored in the public key storage unit 11 is not data generated from the biometric information of the registered person, the public key pk is not a template.

In the present exemplary embodiment, encryption will be described as a specific example of concealment. That is, the concealing unit 13 encrypts the biometric information X of the registered person input to the registration information input unit 12 with the public key pk, and stores the encrypted biometric information X (denoted by Enc(X).) in the concealed information storage unit 14.

In each exemplary embodiment, a case where the concealing unit 13 encrypts the biometric information X of the registered person by an encryption scheme having additive homomorphic properties will be described as an example. That is, in the present example, the public key pk is a public key in a public key encryption scheme having additive homomorphic properties.

Hereinafter, the nature of the encryption scheme having additive homomorphic properties will be described. In this description, a ciphertext obtained by encrypting a plaintext m with the public key pk is referred to as Enc(pk, m). When Enc(pk, m) is represented by another symbol (for example, c), Enc(pk, m) is expressed as Enc(pk, m)→c. In the following description, x and y are numerical values in the plaintext domain and z is an integer in the plaintext domain.

In the encryption scheme having additive homomorphic properties, a ciphertext Enc(pk, x+y) of x+y can be calculated from a ciphertext cr (that is, Enc(pk, x)→$c_1$) of x with the public key pk and a ciphertext $c_2$ (that is, Enc(pk, y)→$c_2$) of y with the public key pk. Hereinafter, this calculation is expressed by the following expression.

$$\oplus \qquad \text{[Math. 1]}$$

That is, the following Equation (1) holds.

[Math. 2]

$$c_1 \oplus c_2 = \text{Enc}(pk, x+y) \qquad (1)$$

The above calculation is repeated, and thus, it can be seen that a ciphertext of x·z (that is, Enc(pk, x·z)) can be calculated from the ciphertext $c_1$ (that is, Enc(pk, x)→$c_1$) of x with the public key pk and the integer z. Hereinafter, this calculation is expressed by the following expression.

$$\odot \qquad \text{[Math. 3]}$$

That is, the following equation (2) holds.

[Math. 4]

$$c_1 \odot z = \text{Enc}(pk, x \cdot z) \qquad (2)$$

Examples of the encryption scheme having additive homomorphic properties include ECElgamal encryption and the like. Accordingly, in the present invention, the ECElgamal encryption may be adopted. However, the ECElgamal encryption is an example, and in the present invention, the encryption scheme having additive homomorphic properties may be adopted.

The concealed information storage unit 14 stores, as a template, Enc(X) obtained by encrypting the biometric information X of the registered person with the public key pk of the public key encryption scheme having additive homomorphic properties.

The matching information input unit 15 receives an input of the matching information. In each exemplary embodiment, the biometric information of the person to be authenticated is input, as the matching information, to the matching information input unit 15. As described above, the registration information and the matching information are represented by the common dimensional vectors.

The matching information input unit 15 may be any input device corresponding to the matching information. For example, when the biometric information extracted from the fingerprint is used as the matching information, the matching information input unit 15 may be an input device that reads the fingerprint, extracts a vector to be the matching information from the fingerprint, and receives an input of the vector. The matching information input unit 15 may be an input device to which the vector to be the matching information is directly input. The registration information input unit 12 and the matching information input unit 15 may be a common input device.

A vector corresponding to the biometric information (matching information) of the person to be authenticated input to the matching information input unit 15 is referred to as Y.

The concealed evaluation value calculation unit 16 calculates data (hereinafter, referred to as a concealed evaluation value.) which is ciphertext of an evaluation value indicating similarity between the biometric information X and the biometric information Y based on the biometric information Y of the person to be authenticated and the template (that is, Enc(X) obtained by encrypting the biometric information X of the registered person). At this time, the concealed evaluation value calculation unit 16 calculates the concealed evaluation value without decrypting the template Enc(X).

Hereinafter, a case where an inner product of X and Y is adopted as an evaluation value indicating the similarity between the biometric information X and the biometric information Y will be described as an example. However, the inner product is an example, and the above evaluation value is not limited to the inner product of X and Y. An example of processing when the evaluation value is the inner product will be described below. In the following description, both the biometric information X and the biometric information Y are n-dimensional vectors. Elements of X are expressed as $X=(x_1, \ldots, x_n)$, and elements of Y are expressed as $Y=(y_1, \ldots, y_n)$. A symbol i expresses $1, \ldots, n$.

The inner product of the biometric information X and the biometric information Y is $\Sigma x_i \cdot y_i$.

When the evaluation value is the inner product, when the biometric information X is input, the concealing unit 13 encrypts the elements $x_1$ to $x_n$ of X with the public key pk. The concealing unit 13 stores, as templates, the pieces of encrypted data in the concealed information storage unit 14. The data obtained by encrypting $x_i$ is referred to as Enc($x_i$).

That is, in the present example, the concealing unit 13 generates Enc($x_i$), . . . , and Enc($x_n$), and stores these pieces of data in the concealed information storage unit 14. In this example, Enc($x_i$), . . . , and Enc($x_n$) correspond to the templates.

The ciphertext of the inner product $\Sigma x_i \cdot y_i$ is expressed as Enc($\Sigma x_i \cdot y_i$). Next, calculation performed by the concealed evaluation value calculation unit 16 to calculate Enc($\Sigma x_i \cdot y_i$) when the biometric information Y is input will be described.

First, when the biometric information $Y=(y_1, \ldots, y_n)$ is input, the concealed evaluation value calculation unit 16 calculates, for each i ($i=1, \ldots, n$), the following expression by using Enc($x_i$) and $y_i$ included in the template.

$$\text{Enc}(x_i) \odot (y_i) \qquad [\text{Math. 5}]$$

Since this calculation is performed for each i, n ciphertexts are obtained.

Next, the concealed evaluation value calculation unit 16 calculates the following expression by using the n ciphertexts.

$$\text{Enc}(x_1 \cdot y_1) \oplus \ldots \oplus \text{Enc}(x_n \cdot y_n) \qquad [\text{Math. 6}]$$

A result of this calculation is Enc($\Sigma x_i \cdot y_i$), and is ciphertext (concealed evaluation value) of the inner product $\Sigma x_i \cdot y_i$ of the biometric information X and the biometric information Y.

The concealed evaluation value transmission unit 17 transmits the concealed evaluation value calculated by the concealed evaluation value calculation unit 16 to the second server 40.

Instead of the inner product of X and Y, for example, "Hamming distance between X and Y" or "squared Euclidean distance between X and Y" may be adopted as the evaluation value indicating the similarity between the biometric information X and the biometric information Y.

Hereinafter, elements included in the second server 40 will be described for ease of description. The elements that have not yet been described among the elements of the client 10 will be described later.

The concealed evaluation value reception unit 42 receives the concealed evaluation value transmitted by the concealed evaluation value transmission unit 17 of the client 10.

The secret key storage unit 41 is a storage device that stores the secret key sk paired with the public key pk. As described above, although not illustrated, the second server 40 includes means for generating the public key pk and the secret key sk, and the secret key storage unit 41 stores the secret key sk.

The determination unit 43 decrypts an evaluation value from the concealed evaluation value (ciphertext of the evaluation value) received by the concealed evaluation value reception unit 42 with the secret key sk stored in the secret key storage unit 41. It can be said that the decryption is cancellation of the concealment. The evaluation value is a numerical value, and the determination unit 43 determines whether or not the biometric information X matches the biometric information Y (in other words, whether or not the registered person matches the person to be authenticated) by determining whether or not the evaluation value decrypted from the concealed evaluation value is a value within a predetermined range set in advance. That is, when the evaluation value decrypted from the concealed evaluation value is the value within the predetermined range, the determination unit 43 determines that the biometric information X matches the biometric information Y (in other words, determines that the registered person matches the person to be authenticated). When the evaluation value decrypted from the concealed evaluation value is not the value within the predetermined range, the determination unit 43 determines that the biometric information X does not match the biometric information Y (in other words, determines that the registered person does not match the person to be authenticated).

As described above, the determination unit determines whether or not the biometric information X matches the biometric information Y depending on whether or not the evaluation value decrypted from the concealed evaluation value is the value within the predetermined range. Accordingly, even though the biometric information X does not completely match the biometric information Y (even though there is a difference that does not cause a problem), when the evaluation value is the value within the predetermined range, the determination unit can determine that the biometric information X matches the biometric information Y. The processing using the predetermined range is an example of processing of determining that the biometric information X matches the biometric information Y even though there is the difference that does not cause the problem.

The certification key storage unit 44 is a storage device that stores a certification key (denoted by sak.) used at the time of generating a certificate indicating that the biometric information X and the biometric information Y are determined to match. Although not illustrated, the second server 40 includes means for generating the certification key sak and a second verification key (denoted by pak.). When a certificate is given, it can be determined whether or not the certificate is a correct certificate by the second verification key pak. The determination as to whether or not the certificate is the correct certificate will be described later. The second server 40 generates the certification key sak and the second verification key pak in advance, stores the certification key sak in the certification key storage unit 44, and transmits the second verification key pak to the first server 30. The second verification key pak is stored in the second verification key storage unit 35 of the first server 30. However, the certification key sak and the second verification key pak may be generated by a device other than the second server 40.

In this example, the certification key sak is a secret key in a public key scheme, and the second verification key pak is a public key in the public key scheme.

When it is determined that the biometric information X matches the biometric information Y, the certificate generation unit 45 generates a certificate indicating the matching by using the certification key sak. In this example, the certificate is a set of data and a signature generated by the certification key sak based on the data.

For example, an identification (ID) of the client 10, an ID of the second server 40, a timestamp (for example, a timestamp of a point in time when the concealed evaluation value is received from the client 10), a message received by the client 10 from the first server 30, a session ID between the client 10 and the second server 40 or the like, or data generated from these pieces of data can be used as data used by the certificate generation unit 45 to generate the certificate. That is, for example, the certificate generation unit 45 may set, as the certificate, sets of one or more of the above pieces of data or a set of data generated from these pieces of data and a signature generated based on the data by using the certification key sk.

The message received by the client 10 from the first server 30 is a message transmitted by the first server 30 (specifically, the message transmission unit 31) to the client 10 as a challenge in the challenge-response method. When the message or the ID of the client 10 is used at the time of generating the certificate, the concealed evaluation value transmission unit 17 of the client 10 may transmit the ID of the client 10 or the message to the second server 40 together with the concealed evaluation value.

The data used to generate the certificate is not limited to the above example.

When the determination unit 43 determines that the biometric information X does not match the biometric information Y, the certificate generation unit 45 does not generate the certificate.

The result transmission unit 46 transmits the determination result of the determination unit 43 to the client 10. When the certificate (certificate indicating that the biometric information X and the biometric information Y are determined to match) is generated by the certificate generation unit 45 as the result of the determination that the biometric information X matches the biometric information Y, the result transmission unit 46 transmits the certificate to the client 10 together with the determination result of the determination unit 43.

Hereinafter, the elements that have not yet been described among the elements of the client 10 will be described.

The result reception unit 18 receives the determination result of the determination unit 43 transmitted by the result transmission unit 46, and also receives the certificate thereof when the result transmission unit 46 transmits the certificate together with the determination result.

The elements of the client 10 to be described below are elements related to a case where the biometric information X and the biometric information Y are determined to match. Accordingly, the description will be given on the assumption that the result reception unit 18 receives the determination result that the biometric information X matches the biometric information Y and the certificate from the second server 40.

The message reception unit 19 receives the message transmitted by the first server 30 (specifically, the message transmission unit 31). This message corresponds to the challenge in the challenge-response method.

The signature key storage unit 20 is a storage device that stores a signature key (denoted by suk.) used when a signature is generated based on a message (challenge) received by the message reception unit 19. Although not illustrated, the client 10 includes means for generating the signature key suk and a first verification key (denoted by puk.). When the signature and the message are given, it can be determined whether or not the signature is a correct signature by the first verification key puk. The client 10 generates the signature key suk and the first verification key puk in advance, stores the signature key suk in the signature key storage unit 20, and transmits the first verification key puk to the first server 30. The first verification key puk is stored in the first verification key storage unit 33 of the first server 30. However, the signature key suk and the first verification key puk may be generated by a device other than the client 10.

In this example, the signature key suk is a secret key in the public key scheme, and the first verification key puk is a public key in the public key scheme.

The signature generation unit 21 generates a signature when the result reception unit 18 receives the determination result that the biometric information X matches the biometric information Y from the second server 40. The signature generation unit 21 generates the signature by using the signature key suk based on the message (challenge) received by the message reception unit 19 from the first server 30.

The signature generated by the signature generation unit 21 corresponds to a response in the challenge-response method.

A timing at which the client 10 acquires the message from the first server 30 may be before the generation of the signature. For example, the message transmission unit 31 may transmit the message to the client 10 in advance, the message reception unit 19 may receive the message, and the message reception unit 19 may retain the message until the signature is generated. For example, at a point in time when the result reception unit 18 receives the determination result that the biometric information X matches the biometric information Y and the certificate from the second server 40, the message reception unit 19 may request the first server 30 to transmit the message and receives the message transmitted by the message transmission unit 31 in response to this request, and then the signature generation unit 21 may generate the signature.

The signature transmission unit 22 transmits the signature generated by the signature generation unit 21 and the certificate received by the result reception unit 18 from the second server 40 to the first server 30.

Hereinafter, the elements included in the first server 30 will be described.

The message transmission unit 31 generates a message corresponding to the challenge in the challenge-response method, and transmits the message to the client 10. This message is received by the message reception unit 19.

The signature reception unit 32 receives the signature and the certificate transmitted by the signature transmission unit 22 of the client 10.

The first verification key storage unit 33 is a storage device that stores the first verification key puk generated by the client 10 and transmitted from the client 10. As described above, the client 10 includes means for generating the signature key suk and the first verification key puk, and transmits the first verification key puk to the first server 30 in advance. The first server 30 receives the first verification key puk, and stores the first verification key puk in the first verification key storage unit 33 in advance.

The second verification key storage unit 35 is a storage device that stores the second verification key pak generated by the second server 40 and transmitted from the second server 40. As described above, the second server 40 includes means for generating the certification key sak and the second verification key pak, and transmits the second verification key pak to the first server 30 in advance. The first server 30 receives the second verification key pak, and stores the second verification key pak in the second verification key storage unit 35 in advance.

The signature determination unit 34 determines whether or not the signature is a correct signature by using the first verification key puk, the message (message corresponding to the challenge) transmitted to the client 10 by the message transmission unit 31, and the signature received from the client 10 by the signature reception unit 32. In other words, the signature determination unit 34 determines whether or not the received signature is a signature generated by using the signature key suk paired with the first verification key puk based on this message. When the received signature is the signature generated by using the signature key suk paired with the first verification key puk based on the message, the received signature is a correct signature. Otherwise, the received signature is an unauthorized signature.

The certificate determination unit 36 determines whether or not the certificate is a correct certificate by using the second verification key pak and the certificate received by the signature reception unit 32 from the client 10. As described above, the certificate is the set of the data and the signature. When the signature included in the certificate is a signature generated by using the certification key sak paired with the second verification key pak based on data included in the certificate, the certificate is a correct certificate. Otherwise, the certificate is an unauthorized certificate. Accordingly, the certificate determination unit 36 may determine whether or not the received certificate is a correct certificate by determining whether the signature included in the certificate received from the client 10 is the signature generated by using the certification key sak paired with the second verification key pak based on data included in the certificate.

The authentication determination unit 37 determines whether the authentication of the person to be authenticated succeeds or fails based on the determination result of the signature determination unit 34 and the determination result of the certificate determination unit 36. Specifically, when the signature determination unit 34 determines that the signature is the correct signature and the certificate determination unit 36 determines that the certificate is the correct certificate, the authentication determination unit 37 determines that the authentication of the person to be authenticated succeeds (in other words, determines that the person to be authenticated is the registered person). That is, when both a condition that the signature is determined to be the correct signature and a condition that the certificate is determined to be the correct certificate are satisfied, the authentication determination unit 37 determines that the authentication of the person to be authenticated succeeds.

On the other hand, when one or both of the above two conditions are not satisfied, the authentication determination unit 37 determines that the authentication of the person to be authenticated fails (in other words, determines that the person to be authenticated is not the registered person).

When the authentication determination unit 37 determines that the authentication of the person to be authenticated succeeds, processing after the authentication may be executed. For example, as an example, the first server 30 may transmit information indicating that the authentication of the person to be authenticated succeeds to the client 10, and the client 10 may execute the processing after the authentication when the information is received. However, the device that executes the processing after the authentication is not limited to the client 10, and a device other than the client 10 may execute the processing after the authentication under the condition that the authentication determination unit 37 determines that the authentication of the person to be authenticated succeeds.

In the client 10, the concealed evaluation value transmission unit 17, the result reception unit 18, the message reception unit 19, and the signature transmission unit 22 are realized by, for example, a central processing unit (CPU) of a computer that operates according to a client program and a communication interface of the computer. For example, the CPU may read a client program from a program recording medium such as a program storage device of the computer, and may operate as the concealed evaluation value transmission unit 17, the result reception unit 18, the message reception unit 19, and the signature transmission unit 22 by using the communication interface according to this program. The concealing unit 13, the concealed evaluation value calculation unit 16, and the signature generation unit 21 are realized by, for example, the CPU of the computer that operates according to the client program. For example, the CPU reads the client program from the program recording medium as described above, and may operate as the concealing unit 13, the concealed evaluation value calculation unit 16, and the signature generation unit 21 according to this program. The public key storage unit 11, the concealed information storage unit 14, and the signature key storage unit 20 are realized by, for example, a storage device included in the computer that realizes the client 10.

In the second server 40, the concealed evaluation value reception unit 42 and the result transmission unit 46 are realized by, for example, a CPU of a computer that operates according to a server program and a communication interface of the computer. For example, the CPU may read the server program from a program recording medium such as a program storage device of the computer, and operate as the concealed evaluation value reception unit 42 and the result transmission unit 46 by using the communication interface according to this program. The determination unit 43 and the certificate generation unit 45 are realized by, for example, the CPU of the computer that operates according to the server program. For example, the CPU reads the server program from the program recording medium as described above, and may operate as the determination unit 43 and the certificate generation unit 45 according to this program. The secret key storage unit 41 and the certification key storage unit 44 are realized by, for example, a storage device included in the computer that realizes the second server 40.

In the first server 30, the message transmission unit 31 and the signature reception unit 32 are realized by, for example, a CPU of a computer that operates according to a server program, and a communication interface of the computer. For example, the CPU may read a server program from a program recording medium such as a program storage device of the computer, and operate as the message transmission unit 31 and the signature reception unit 32 by using the communication interface according to this program. The signature determination unit 34, the certificate determination unit 36, and the authentication determination unit 37 are realized by, for example, the CPU of the computer that operates according to the server program. For example, the CPU reads the server program from the program recording medium as described above, and may operate as the signature determination unit 34, the certificate determination unit 36, and the authentication determination unit 37 according to this program. The first verification key storage unit 33 and the second verification key storage unit 35 are realized by, for example, a storage device included in the computer that realizes the first server 30.

In the present exemplary embodiment, since the first server 30 and the second server 40 are different servers, the server program installed on the first server 30 and the server program installed on the second server 40 are different programs.

Next, a processing progress according to the first exemplary embodiment will be described. In the following description, the public key pk is already stored in the public key storage unit 11 included in the client 10, the signature key suk is already stored in the signature key storage unit 20, and the template Enc(X)(in this example, Enc($x_i$), . . . , and Enc($x_n$)) is already stored in the concealed information storage unit 14. Similarly, the secret key sk is already stored in the secret key storage unit 41 included in the second server 40, and the certification key sak is already stored in the certification key storage unit 44. Similarly, the first verification key puk is already stored in the first verification key storage unit 33 included in the first server 30, and the second verification key pak is already stored in the second verification key storage unit 35. In the following example, the message reception unit 19 of the client 10 receives the message corresponding to the challenge from the message transmission unit 31 of the first server 30 in advance and retains the message.

Figure 4:
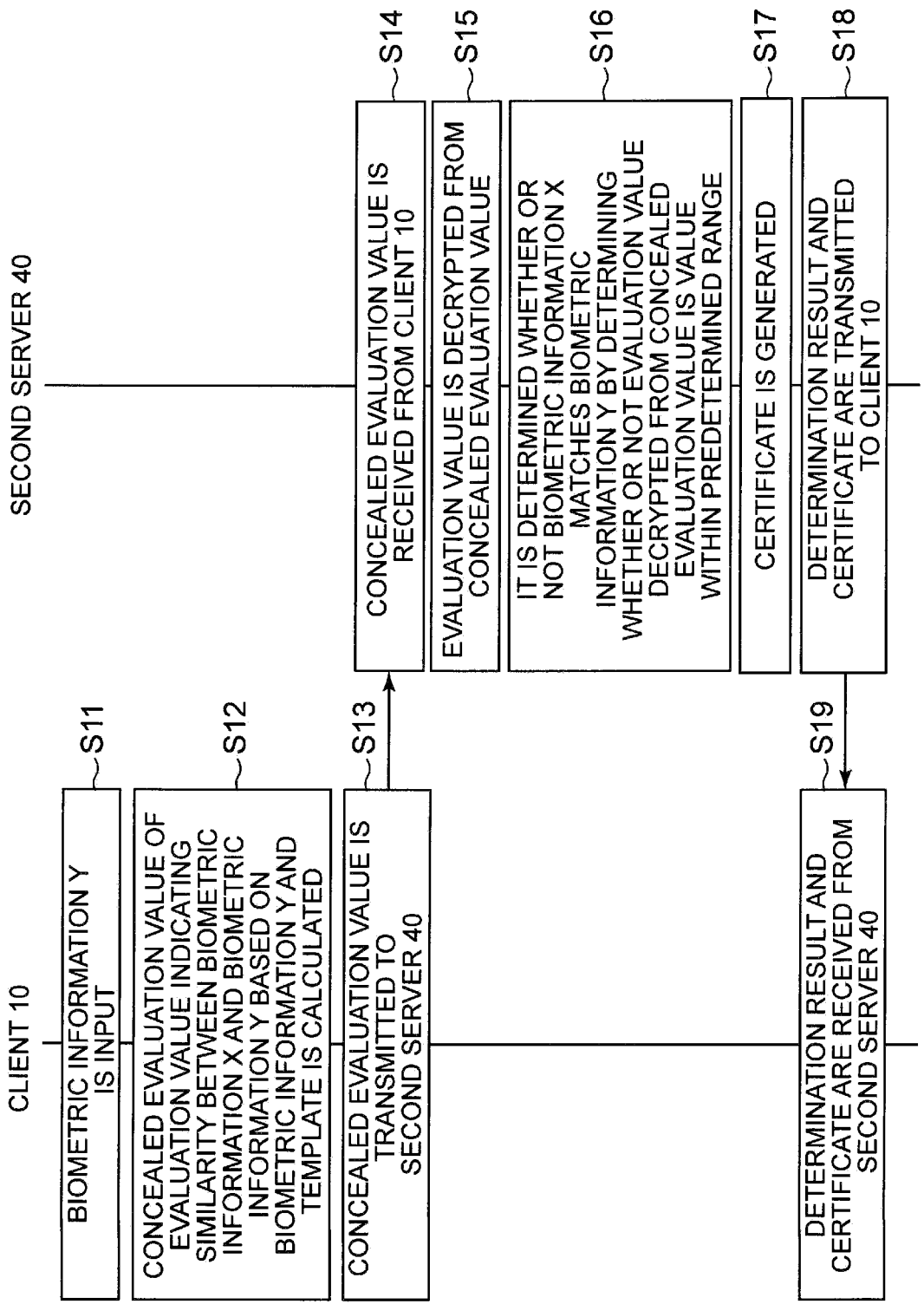
FIG. 4 It depicts a flowchart illustrating an example of a processing progress from when biometric information Y of a person to be authenticated is input to a client 10 to when a certificate generated in a second server 40 is received by the client 10.

FIG. 4 is a flowchart illustrating an example of a processing progress from when the biometric information Y of the person to be authenticated is input to the client 10 to when the client 10 receives the certificate generated in the second server 40. Detailed description of the matters already described will be omitted.

First, the biometric information Y of the person to be authenticated is input to the matching information input unit 15 (step S1).

Subsequently, the concealed evaluation value calculation unit 16 calculates the concealed evaluation value that is ciphertext of the evaluation value indicating the similarity between the biometric information X and the biometric information Y based on the biometric information Y input in step S11 and the template (Enc(X)) stored in the concealed information storage unit 14 (step S12). In step S12, the concealed evaluation value calculation unit 16 calculates the concealed evaluation value without decrypting Enc(X).

In the present example, the inner product of the biometric information X and the biometric information Y is adopted as the above evaluation value. That is, the concealed evaluation value calculation unit 16 calculates the ciphertext (concealed evaluation value) of the inner product of the biometric information X and the biometric information Y based on the biometric information Y and the template. Since the method for calculating the encrypted inner product has already been described, the description thereof is omitted herm. As described above, the evaluation value is not limited to the inner product, and for example, "Hamming distance between X and Y" or "squared Euclidean distance between X and Y" may be adopted as the evaluation value.

Subsequently, the concealed evaluation value transmission unit 17 transmits the concealed evaluation value calculated in step S12 to the second server 40 (step S13).

The concealed evaluation value reception unit 42 of the second server 40 receives the concealed evaluation value from the client 10 (step S14).

Subsequently, the determination unit 43 decrypts the evaluation value from the concealed evaluation value with the secret key sk stored in the secret key storage unit 41 (step S15). The determination unit 43 determines whether or not the biometric information X matches the biometric information Y by determining whether or not the evaluation value decrypted from the concealed evaluation value is a value within a predetermined range set in advance (step S16).

FIG. 4 illustrates a case where it is determined in step S16 that the biometric information X matches the biometric information Y. When it is determined in step S16 that the biometric information X matches the biometric information Y, the certificate generation unit 45 generates the certificate by using the certification key sak stored in the certification key storage unit 44 (step S17).

After step S17, the result transmission unit 46 transmits the determination result that the biometric information X matches the biometric information Y and the certificate generated in step S17 to the client 10 (step S18).

The result reception unit 18 of the client 10 receives the determination result and the certificate from the second server 40 (step S19).

When it is determined in step S16 that the biometric information X does not match the biometric information Y, the certificate generation unit 45 does not generate the certificate (that is, step S17 is not executed). In step S18, the result transmission unit 46 transmits the determination result that the biometric information X does not match the biometric information Y to the client 10. In this case, since the certificate is not generated, the result transmission unit 46 does not transmit the certificate. The result reception unit 18 of the client 10 receives the determination result that the biometric information X does not match the biometric information Y. When the result reception unit 18 of the client 10 receives the determination result that the biometric information X does not match the biometric information Y, the processing for the input of the biometric information Y is ended.

Figure 5:
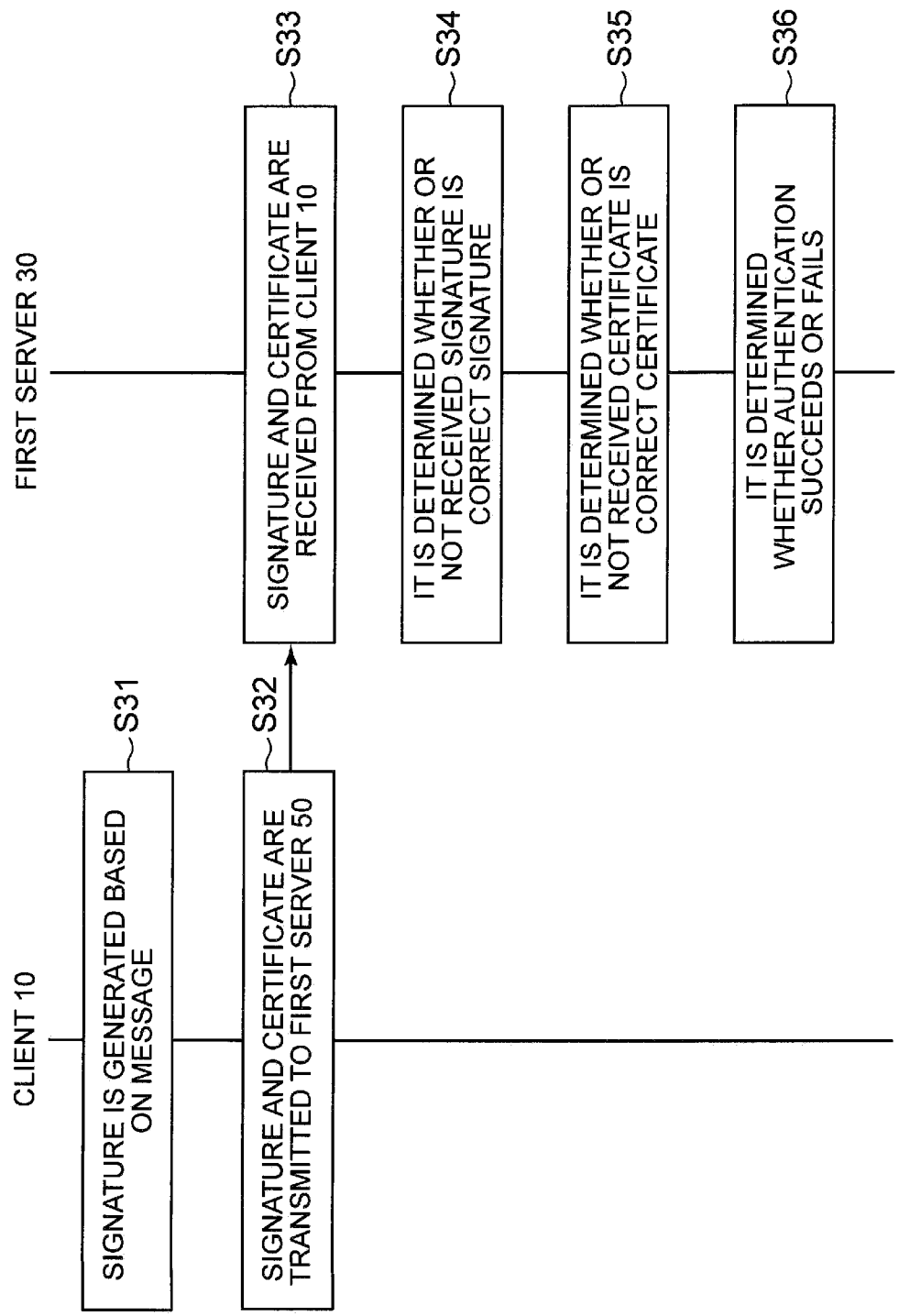
FIG. 5 It depicts a flowchart illustrating an example of a processing progress after the client 10 receives a determination result that biometric information X matches the biometric information Y and the certificate from the second server 40.

FIG. 5 is a flowchart illustrating an example of a processing progress after the client 10 receives the determination result that the biometric information X matches the biometric information Y and the certificate from the second server 40. Detailed description of the matters already described will be omitted.

When the result reception unit 18 of the client 10 receives the determination result that the biometric information X matches the biometric information Y and the certificate from the second server 40, the signature generation unit 21 generates the signature by using the signature key suk based on the message (challenge) already received by the message reception unit 19 from the first server 30 (step S31). As described above, this signature corresponds to the response in the challenge-response method.

As described above, at a point in time when the result reception unit 18 receives the determination result that the biometric information X matches the biometric information Y from the second server 40 and the certificate, the message reception unit 19 may request the first server 30 to transmit the message, the message reception unit 19 may receive the message transmitted by the message transmission unit 31 in response to this request, and then the signature generation unit 21 may generate the signature.

After step S31, the signature transmission unit 22 transmits the signature generated in step S31 and the certificate received by the result reception unit 18 from the second server 40 to the first server 30 (step S32).

The signature reception unit 32 of the first server 30 receives the signature and the certificate from the client 10 (step S33).

Subsequently, the signature determination unit 34 determines whether or not the signature is a correct signature by using the first verification key puk, the message transmitted to the client 10 in advance by the message transmission unit 31, and the signature received from the client 10 by the signature reception unit 32 in step S33 (step S34).

The certificate determination unit 36 determines whether or not the certificate is a correct certificate by using the second verification key pak and the certificate received by the signature reception unit 32 from the client 10 in step S33 (step S35).

The order of steps S34 and S35 is not limited. Step S34 and step S35 may be executed in parallel.

The authentication determination unit 37 determines whether the authentication of the person to be authenticated succeeds or fails based on the determination result of the signature determination unit 34 and the determination result of the certificate determination unit 36 (step S36). When both a condition that the signature is determined to be the correct signature and a condition that the certificate is determined to be the correct certificate are satisfied, the authentication determination unit 37 determines that the authentication of the person to be authenticated succeeds. When one or both of the above two conditions are not satisfied, the authentication determination unit 37 determines that the authentication of the person to be authenticated fails.

The processing described with reference to FIGS. 4 and 5 may be repeatedly executed.

According to the present exemplary embodiment, the client 10 transmits the concealed evaluation value calculated by the concealed evaluation value calculation unit 16 to the second server 40. In the second server 40, the determination unit 43 decrypts the evaluation value from the concealed evaluation value, and determines whether or not the matching information matches the registration information based on the evaluation value obtained by the decryption. When it is determined that the matching information matches the registration information, the certificate generation unit 45 generates the certificate indicating that these pieces of information match by using the certification key sak. The second server 40 transmits the determination result indicating that the matching information matches the registration information and the certificate to the client 10. In the client 10, the signature generation unit 21 generates the signature by using the signature key suk based on the message acquired from the first server 30. The client 10 transmits the signature (response to the message) and the certificate to the first server 30. In the first server 30, the signature determination unit 34 determines whether or not the signature is a correct signature by using the first verification key puk, the message, and the signature. The certificate determination unit 36 determines whether or not the certificate is a correct certificate by using the second verification key pak and the certificate. When both a condition that the signature is determined to be the connect signature and a condition that the certificate is determined to be the correct certification are satisfied, the authentication determination unit 37 determines that the authentication of the person to be authenticated succeeds.

Accordingly, even though malware or unauthorized application software is incorporated in the client 10, it is possible to prevent the determination that the authentication succeeds due to the malware or the unauthorized application software. That is, even though it is not actually determined whether or not the matching information matches the registration information, the malware or the like gives a false determination result that the matching information matches the registration information to the signature generation unit 21, and thus, the signature generation unit 21 generates the signature based on the message by using the signature key suk. The signature is transmitted to the first server 30, and the signature determination unit 34 determines that the signature is a correct signature. However, in this case, since it is not actually determined whether or not the matching information matches the registration information, the certificate generation unit 45 of the second server 40 does not generate the certificate. Accordingly, in the first server 30, the certificate determination unit 36 does not determine whether or not the certificate is a correct certificate. As a result, the authentication determination unit 37 does not determine that the authentication of the person to be authenticated succeeds. Even though the malware or the like incorporated in the client 10 falsifies a certificate and transmits the certificate to the first server 30, since the client 10 and the malware do not have the certification key sak paired with the second certification key pak, the certificate determination unit 36 does not determine that the falsified certificate is a correct certificate. As described above, in the present exemplary embodiment, when the authentication using the two factors is performed, an effect that it is possible to prevent the determination that the authentication of the person to be authenticated succeeds is obtained even though the determination as to whether or not the matching information matches the registration information is not performed.

Next, various modification examples of the above exemplary embodiment will be described.

In the above exemplary embodiment, the client 10 and the second server 40 exchange the concealed evaluation value, and thus, the determination unit 43 of the second server 40 determines whether or not the biometric information X matches the biometric information Y. The challenge-response method may be applied to the communication between the client 10 and the second server 40 when the determination unit 43 derives the determination result.

The concealing unit 13 of the client 10 may generate a template by using a random number when the template is generated. In this case, after the template is generated, the client 10 transmits the random number to the second server 40, and then deletes the random number. When the random number is received, the second server 40 assigns an ID to the client 10 and notifies the client 10 of the ID. When the concealed evaluation value is transmitted to the second server 40, the concealed evaluation value transmission unit 17 of the client 10 also transmits the ID thereof. When the evaluation value is decrypted from the concealed evaluation value, the second server 40 may decrypt the evaluation value by also using the random number corresponding to the ID.

Accordingly, the data transmitted from the client 10 to the second server 40 in order to determine whether or not the biometric information X matches the biometric information Y is not limited to the concealed information (ciphertext of the inner product of X and Y) described in the first exemplary embodiment.

These points are similar in other exemplary embodiments.

In the above exemplary embodiment, the certificate is sent from the second server 40 to the first server 30 via the client 10. The second server 40 may transmit the certificate directly to the first server 30 via the communication network. In this case, the result transmission unit 46 of the second server 40 may transmit the determination result that the biometric information X matches the biometric information Y to the client 10, and may transmit the certificate directly to the first server 30 via the communication network. In the first server 30, for example, the signature reception unit 32 may receive the certificate.

In the client 10, when the result reception unit 18 receives the determination result, the signature generation unit 21 may generate the signature, and the signature transmission unit 22 may transmit the signature to the first server 30. The first server 30 may receive the signature. As described above, after the first server 30 receives the certificate from the second server 40 and receives the signature from the client 10, the first server 30 may perform the processing in and after step S34 (see FIG. 5).

Here, the first server 30 needs to recognize an association between the signature and the certificate. Thus, in the present modification example, the signature and the certificate transmitted to the first server 30 are transmitted to the first server 30 together with data with which the association between the signature and the certificate can be confirmed. The data with which the association between the two pieces of information (signature and certificate) can be confirmed may be, for example, data common to the two pieces of information. Hereinafter, a case where the data with which the correspondence between the two pieces of information can be confirmed is common data between the two pieces of information will be described as an example. As the common data, for example, the session ID of the communication between the client 10 and the second server 40, the message (challenge) transmitted by the first server 30 to the client 10, a combination thereof, one or more thereof, or data generated therefrom can be used. However, these pieces of data are examples, and the common data is not limited to the session ID, the message, and the like.

An example of processing when the common data is the session ID will be described. When the certificate is transmitted to the first server 30, the result transmission unit 46 transmits the certificate to the first server 30 together with the session ID of the communication between the client 10 and the second server 40. In this case, when the signature generated by the signature generation unit 21 is transmitted to the first server 30, the signature transmission unit 22 of the client 10 transmits the signature to the first server 30 together with the session ID. The first server 30 may perform the processing in and after step S34 (see FIG. 5) on the signature and the certificate having the common session ID.

An example of processing when the common data is the message (challenge) will be described. In this case, for example, the concealed evaluation value transmission unit 17 may transmit the message to the second server 40 together with the concealed evaluation value. However, a transmission aspect of the message from the client 10 to the second server 40 is not limited to the above example. When the certificate is transmitted to the first server 30, the result transmission unit 46 transmits the certificate to the first server 30 together with the message received from the client 10. In this case, when the signature generated by the signature generation unit 21 is transmitted to the first server 30, the signature transmission unit 22 of the client 10 transmits the signature to the first server 30 together with the message. The first server 30 may perform the processing in and after step S34 (see FIG. 5) on the signature and the certificate having the common message.

In the above exemplary embodiment, a case where the certification key sak is a secret key in the public key scheme and the second verification key pak is a public key in the public key scheme has been described as an example. The certification key sak and the second verification key pak may be common keys in a common key scheme.

When the certification key sak and the second verification key pak are the common keys in the common key scheme, the certificate generated by the certificate generation unit 45 may be a set of data and a tag generated by using the data in a message authentication code (MAC). The tag in the message authentication code is generated by data and a key used at the time of generating the tag. When the set of the data and the key is common, the tag to be generated is also common. Here, a case where the data used at the time of generating the tag is a timestamp (for example, a timestamp of a point in time when the concealed evaluation value is received from the client 10) will be described as an example. However, the data used at the time of generating the tag is not limited to the timestamp, and may be various kinds of data (various kinds of data such as the ID of the client 10) exemplified as the data used to generate the certificate.

The certificate generation unit 45 generates the tag in the message authentication code by using the certification key sak and the timestamp. The set of the timestamp and the generated tag is sent, as the certificate, to the first server 30. An aspect in which the certificate is sent from the second server 40 to the first server 30 may be an aspect in which the certificate is sent to the first server 30 via the client 10, or may be an aspect in which the certificate is sent directly to the first server 30 from the second server 40 without passing through the client 10. In the former aspect, the result transmission unit 46 may transmit the certificate to the client 10, and the signature transmission unit 22 may transmit the certificate and the signature to the first server 30. In the latter case, the result transmission unit 46 may transmit the certificate directly to the first server 30 via the communication network.

In the first server 30, for example, when the signature reception unit 32 receives the certificate, the certificate determination unit 36 may determine whether or not the certificate is a correct certificate by determining whether or not the certification key used at the time of generating the certificate (at the time of generating the tag) is the certification key sak paired with the second verification key pak. That is, the certificate determination unit 36 generates the tag in the message authentication code by using the second verification key pak and the timestamp included in the acquired certificate. When the generated tag matches the tag included in the acquired certificate, the certificate determination unit 36 determines that the certification key used at the time of generating the certificate (at the time of generating the tag) is the certification key sak paired with the second verification key pak. In this case, the certificate determination unit 36 determines that the received certificate is the correct certificate. When the generated tag does not match the tag included in the acquired certificate, the certificate determination unit 36 determines that the certification key used at the time of generating the certificate (at the time of generating the tag) is not the certification key sak paired with the second verification key pak. In this case, the certificate determination unit 36 determines that the received certificate is an unauthorized certificate.

The processing of steps S34 to S36 may be executed whenever the challenge response is exchanged between the first server 30 and the client 10 multiple times. That is, although the first server 30 transmits the message (challenge) to the client 10, and the first server 30 acquires the signature (response) and the certificate, the processing of steps S34 to S36 may be executed whenever this challenge response is exchanged multiple times. In other words, the processing in steps S34 to S36 may not be performed whenever this challenge response is exchanged. In this case, when the processing of steps S34 to S36 is not performed, for example, the processing of step S35 may be omitted. The authentication determination unit 37 may determine that the authentication of the person to be authenticated succeeds when the signature determination unit 34 determines that the signature is the correct signature, and may determine that the authentication of the person to be authenticated fails when the signature determination unit determines that the signature is the unauthorized signature. These points are similar in other exemplary embodiments.

The first server 30 may be configured to execute the processing of steps S34 to S36 when an event different from normal is detected, when a transmission source of the certificate is a predetermined transmission source (for example, a transmission source recognized as an attacker), or when the transmission source of the certificate is not a predetermined transmission source (here, for example, a transmission source corresponding to an authorized user) and omit the processing of step S35 in other cases. When the processing of step S35 is omitted, as described above, the authentication determination unit 37 may determine that the authentication of the person to be authenticated succeeds when the signature determination unit 34 determines that the signature is the correct signature, and may determine that the authentication of the person to be authenticated fails when the signature determination unit determines that the signature is the unauthorized signature. These points are similar in other exemplary embodiments.

Second Exemplary Embodiment

Figure 6:
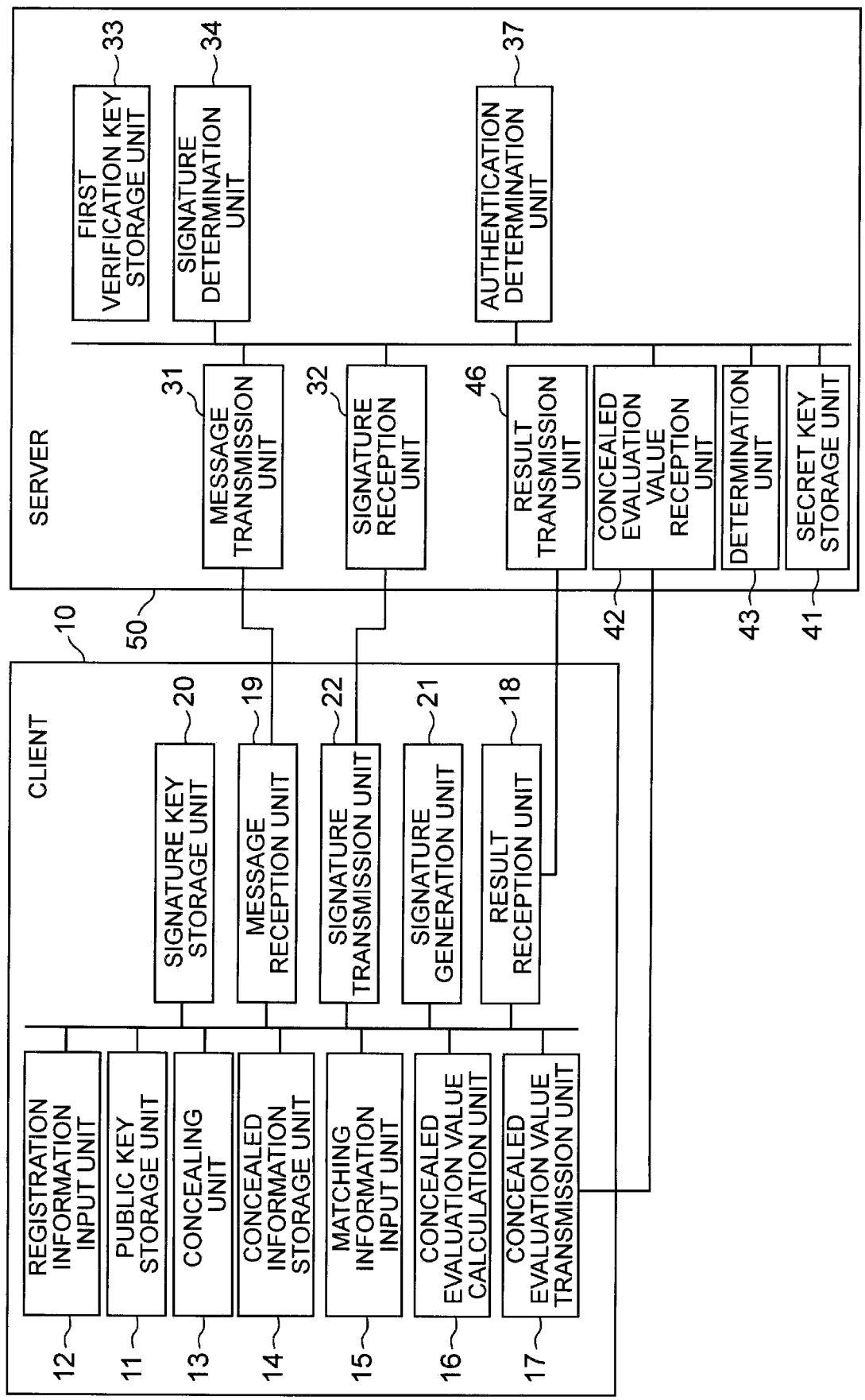
FIG. 6 It depicts a block diagram illustrating a configuration example of an authentication system according to a second exemplary embodiment of the present invention.

FIG. 6 is a block diagram illustrating a configuration example of an authentication system according to a second exemplary embodiment of the present invention. Elements similar to those in the first exemplary embodiment ar denoted by the same reference signs as those in FIG. 3, and description of operations similar to those in the first exemplary embodiment will be omitted.

The authentication system according to the second exemplary embodiment includes a client 10 and a server 50. There may be a plurality of clients 10. The client 10 and the server 50 can communicate with each other via a communication network.

The elements included in the client 10 according to the second exemplary embodiment are similar to the elements included in the client 10 according to the first exemplary embodiment.

The server 50 includes a message transmission unit 31, a signature reception unit 32, a first verification key storage unit 33, a signature determination unit 34, an authentication determination unit 37, a secret key storage unit 41, a concealed evaluation value reception unit 42, a determination unit 43, and a result transmission unit 46.

In the following description, the public key pk is already stored in the public key storage unit 11 included in the client 10, and the signature key suk is already stored in the signature key storage unit 20. The secret key sk is already stored in the secret key storage unit 41 included in the server 50, and the first verification key puk is already stored in the first verification key storage unit 33.

Since an operation until the determination unit 43 determines whether or not the biometric information X matches the biometric information Y is similar to the operation until the determination unit 43 determines whether or not the biometric information X matches the biometric information Y in the first embodiment, the description thereof will be omitted.

In the second exemplary embodiment, when it is determined that the biometric information X matches the biometric information Y, the determination unit 43 transmits the determination result to the authentication determination unit 37.

When it is determined that the biometric information X does not match the biometric information Y, the determination unit 43 may not send the determination result to the authentication determination unit 37. However, even when it is determined that the biometric information X does not match the biometric information Y, the determination unit 43 may transmit the determination result to the authentication determination unit 37. Hereinafter, a case where the determination unit 43 does not send the determination result to the authentication determination unit 37 when it is determined that the biometric information X does not match the biometric information Y will be described as an example.

In the second exemplary embodiment, the result transmission unit 46 transmits the determination result of the determination unit 43 to the client 10 regardless of the determination result.

The result reception unit 18 receives the determination result of the determination unit 43 transmitted from the result transmission unit 46. When the result reception unit 18 receives the determination result that the biometric information X does not match the biometric information Y, the processing for the input of the biometric information Y is ended.

Hereinafter, a case where the result reception unit 18 receives the determination result that the biometric information X matches the biometric information Y will be described. In this case, the signature generation unit 21 generates the signature (response) by using the signature key suk based on the message (challenge) received by the message reception unit 19 from the server 50 (specifically, the message transmission unit 31).

A timing at which the client 10 acquires the message from the server 50 may be before the generation of the signature. For example, the message transmission unit 31 may transmit the message to the client 10 in advance, the message reception unit 19 may receive the message, and the message reception unit 19 may retain the message until the signature is generated. For example, at a point in time when the result reception unit 18 receives the determination result that the biometric information X matches the biometric information Y from the server 50, the message reception unit 19 may request the server 50 to transmit the message, and may receive the message transmitted by the message transmission unit 31 in response to this request, and then the signature generation unit 21 may generate the signature. These points are similar in the first exemplary embodiment.

The signature transmission unit 22 transmits the signature generated by the signature generation unit 21 to the server 50. The signature reception unit 32 of the server 50 receives the signature.

Here, the server 50 needs to recognize the association between the signature and the determination result sent from the determination unit 43 to the authentication determination unit 37. Thus, in the second exemplary embodiment, data with which the association between the two pieces of information can be confirmed is added to the signature and the determination result sent from the determination unit 43 to the authentication determination unit 37. The data with which the association between the two pieces of information can be confirmed may be, for example, data common to the two pieces of information. Hereinafter, a case where the data with which the correspondence between the two pieces of information can be confirmed is common data between the two pieces of information will be described as an example. As the common data, for example, a session ID between the client 10 and the server 50, a message (challenge) transmitted by the message transmission unit 31 of the server 50 to the client 10, a combination thereof, one or more thereof, or data generated therefrom can be used. However, these pieces of data are examples, and the common data is not limited to the session ID, the message, and the like.

An example of processing when the common data is the session ID will be described. When the determination result (the determination result that the biometric information X matches the biometric information Y) is sent to the authentication determination unit 37, the determination unit 43 sends the determination result to which the session ID of the communication between the client 10 and the server 50 is added to the authentication determination unit 37. When the signature generated by the signature generation unit 21 is transmitted to the server 50, the signature transmission unit 22 of the client 10 transmits the signature to which the session ID is added to the server 50.

The authentication determination unit 37 determines whether the authentication succeeds or fails based on the determination result of the signature determination unit 34 for the signature and the determination result sent from the determination unit 43 to which the data common to the signature is added.

In the server 50, the concealed evaluation value reception unit 42, the result transmission unit 46, the message transmission unit 31, and the signature reception unit 32 are realized by, for example, a CPU of a computer that operates according to a server program and a communication interface of the computer. For example, the CPU may read the server program from a program recording medium such as a program storage device of the computer, and may operate as the concealed evaluation value reception unit 42, the result transmission unit 46, the message transmission unit 31, and the signature reception unit 32 by using the communication interface according to this program. The determination unit 43, the signature determination unit 34, and the authentication determination unit 37 are realized by, for example, the CPU of the computer that operates according to the server program. For example, the CPU reads the server program from the program recording medium as described above, and may operate as the determination unit 43, the signature determination unit 34, and the authentication determination unit 37 according to this program. The secret key storage unit 41 and the first verification key storage unit 33 are realized by the storage device included in the computer.

Next, a processing progress according to the second exemplary embodiment will be described. As described above, since an operation until the determination unit 43 determines whether or not the biometric information X matches the biometric information Y is similar to that in the first exemplary embodiment, the description thereof will be omitted. When the determination unit 43 determines that the biometric information X does not match the biometric information Y, the determination result is sent from the result transmission unit 46 to the result reception unit 18, and the processing is ended.

Figure 7:
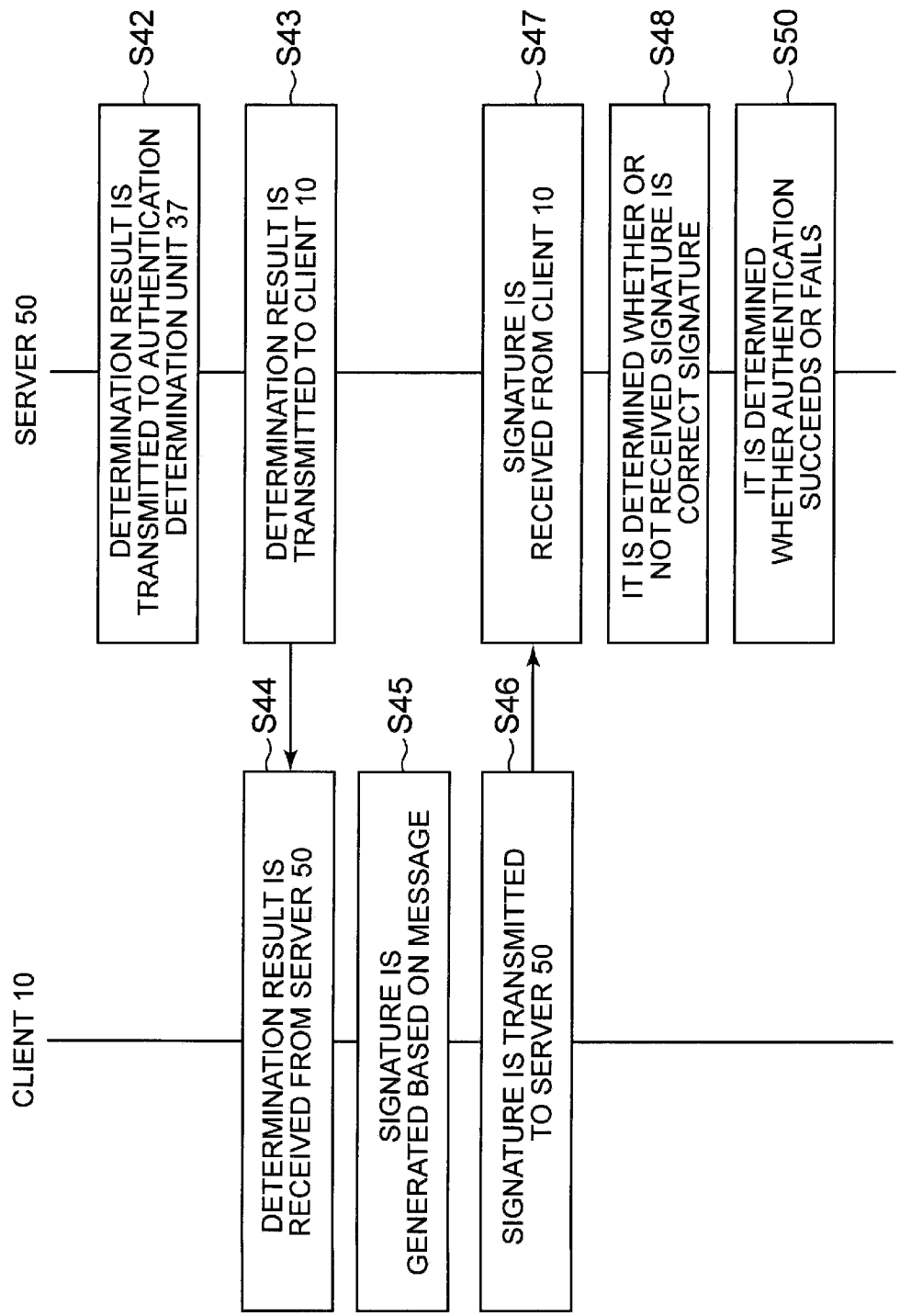
FIG. 7 It depicts a flowchart illustrating an example of a processing progress after a determination unit 43 determines that the biometric information X matches the biometric information Y in the second exemplary embodiment.

In the following description, a processing progress after the determination unit 43 determines that the biometric information X matches the biometric information Y will be described. FIG. 7 is a flowchart illustrating an example of a processing progress after the determination unit 43 determines that the biometric information X matches the biometric information Y in the second exemplary embodiment. Detailed description of the matters already described will be omitted.

When it is determined that the biometric information X matches the biometric information Y, the determination unit 43 adds, to the determination result, data (for example, the session ID of the communication between the client 10 and the server 50) common to the data to be added to the signature associated with the determination result, and sends the determination result to the authentication determination unit 37 (step S42). The session ID is an example of the data to be added to the signature and the determination result by the determination unit 43, and the common data may be added to the signature and the determination result by the determination unit 43.

The result transmission unit 46 transmits the determination result that the biometric information X matches the biometric information Y to the client 10 (step S43), and the result reception unit 18 of the client 10 receives the determination result (step S44).

When the result reception unit 18 receives the determination result that the biometric information X matches the biometric information Y, the signature generation unit 21 generates the signature by using the signature key suk based on the message (challenge) already received by the message reception unit 19 from the server 50 (step S45). The message reception unit 19 may request the server 50 to transmit the message and receive the message from the server 50 at a point in time when the result reception unit 18 receives the determination result that the biometric information X matches the biometric information Y from the server 50.

The signature generation unit 21 adds, to the signature, data (for example, the session ID of the communication between the client 10 and the server 50) common to the data to be added to the determination result associated with the signature (the determination result by the determination unit 43).

The signature transmission unit 22 transmits the signature to the server 50 (step S46), and the signature reception unit 32 of the server 50 receives the signature (step S47).

Subsequently, the signature determination unit 34 determines whether or not the signature is a correct signature by using the first verification key puk, the message transmitted to the client 10 in advance by the message transmission unit 31, and the signature received from the client 10 by the signature reception unit 32 in step S47 (step S48).

The authentication determination unit 37 determines whether the authentication of the person to be authenticated succeeds or fails based on the determination result by the signature determination unit 34 and the determination result by the determination unit 43 to which the data common to the data to be added to the signature used for the determination by the signature determination unit 34 is added (step S50). When both a condition that the signature is determined to be the correct signature and a condition that the determination result that the biometric information X matches the biometric information Y is obtained from the determination unit 43 are satisfied, the authentication determination unit 37 determines that the authentication of the person to be authenticated succeeds. When one or both of the above two conditions are not satisfied, the authentication determination unit 37 determines that the authentication of the person to be authenticated fails.

In the present exemplary embodiment, as described above, when both the condition that the signature is determined to be the correct signature and the condition that the determination result that the biometric information X matches the biometric information Y is obtained from the determination unit 43 are satisfied, the authentication determination unit 37 determines that the authentication of the person to be authenticated succeeds. Accordingly, effects similar to those of the first exemplary embodiment are obtained. That is, even though malware or the like is incorporated in the client 10, it is possible to prevent the determination that the authentication of the person to be authenticated succeeds even though the determination as to whether the matching information matches the registration information is not performed.

Next, various modification examples of the second exemplary embodiment will be described. Description of the matters already described will be omitted.

The server 50 may not notify the client 10 of the determination result by the determination unit 43. In this case, the signature generation unit 21 of the client 10 generates the signature by using the signature key suk based on the message received by the message reception unit 19 in a state where the determination result by the determination unit 43 is not notified.

As another modification example, the message transmission unit 31 may transmit the message to the client 10 only when the determination unit 43 determines that the biometric information X matches the biometric information Y. In the client 10, when the message reception unit 19 receives the message, the signature generation unit 21 generates the signature using the signature key suk based on the message. The signature transmission unit 22 transmits the signature to the server 50. In this modification example, the signature generation unit 21 generates the signature, and the signature transmission unit 22 transmits the signature to the server 50 only when it is determined that the biometric information X matches the biometric information Y. Accordingly, in this modification example, the data for associating the signature with the determination result sent from the determination unit 43 to the authentication determination unit 37 may not be used. In this modification example, regardless of whether or not it is determined that the biometric information X matches the biometric information Y, the server 50 may or may not notify the client 10 of the determination result by the determination unit 43.

As another modification example, when the client 10 transmits the concealed evaluation value to the server 50, the concealed evaluation value transmission unit 17 (may be the signature transmission unit 22.) may transmit the concealed evaluation value together with the signature generated by the signature generation unit 21 to the server 50. In this modification example, the signature generation unit 21 generates the signature by using the signature key suk based on the message received by the message reception unit 19 without acquiring the determination result by the determination unit 43 (more specifically, before the determination unit 43 performs the determination processing). In this modification example, the server 50 receives the concealed evaluation value together with the signature. Accordingly, the server 50 can recognize the association between the determination result derived by the determination unit 43 based on the concealed evaluation value and the signature. Thus, in the present modification example, the data for associating the signature with the determination result sent from the determination unit 43 to the authentication determination unit 37 may not be used.

The various modification examples of the first exemplary embodiment can also be appropriately applied to the second exemplary embodiment.

Third Exemplary Embodiment

Figure 8:
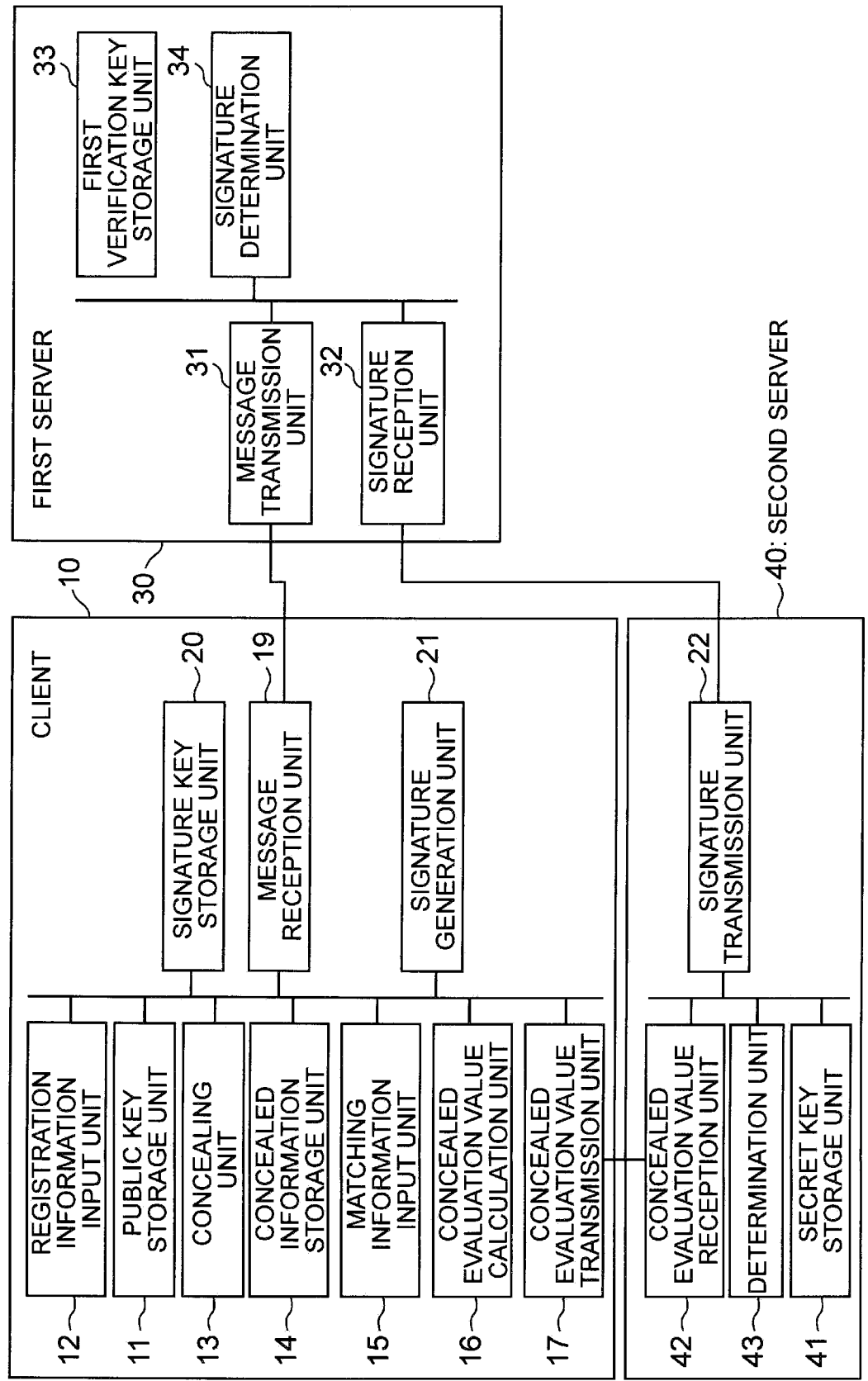
FIG. 8 It depicts a block diagram illustrating a configuration example of an authentication system according to a third exemplary embodiment of the present invention.

FIG. 8 is a block diagram illustrating a configuration example of an authentication system according to a third exemplary embodiment of the present invention. Elements similar to those in the first exemplary embodiment and the second exemplary embodiment are denoted by the same reference signs as those in FIGS. 3 and 6. Description of operations similar to those of the first exemplary embodiment and the second exemplary embodiment will be omitted.

The authentication system according to the third exemplary embodiment includes a client 10, a first server 30, and a second server 40. There may be a plurality of clients 10. The client 10, the first server 30, and the second server 40 can communicate via a communication network.

In the third exemplary embodiment, the client 10 includes a public key storage unit 11, a registration information input unit 12, a concealing unit 13, a concealed information storage unit 14, a matching information input unit 15, a concealed evaluation value calculation unit 16, a concealed evaluation value transmission unit 17, a message reception unit 19, a signature key storage unit 20, and a signature generation unit 21.

The public key storage unit 11, the registration information input unit 12, the concealing unit 13, the concealed information storage unit 14, the matching information input unit 15, the concealed evaluation value calculation unit 16, the message reception unit 19, and the signature key storage unit 20 are similar to the elements in the first exemplary embodiment.

In the third exemplary embodiment, the signature generation unit 21 generates the signature without receiving the determination result as to whether the biometric information X matches the biometric information Y from the second server 40. For example, the signature generation unit 21 may generate the signature before a timing at which the concealed evaluation value transmission unit 17 transmits the concealed evaluation value to the second server 40. However, a timing at which the signature generation unit 21 generates the signature is not limited to the above example.

The signature generation unit 21 generates the signature by using the signature key suk based on the message received by the message reception unit 19 from the first server 30. This point is similar to each of the above-described exemplary embodiments. The message reception unit 19 may receive the message from the first server 30 before the signature generation unit 21 generates the signature. For example, when the signature generation unit 21 generates the signature, the message reception unit 19 may request the server 50 to transmit the message, and the message reception unit 19 may receive the message transmitted by the message transmission unit 31 in response to this request.

In the third exemplary embodiment, the concealed evaluation value transmission unit 17 transmits not only the concealed evaluation value but also the signature generated by the signature generation unit 21 to the second server. Hereinafter, a case where the concealed evaluation value transmission unit 17 transmits the concealed evaluation value together with the signature to the second server will be described as an example.

In the third exemplary embodiment, the second server 40 includes a secret key storage unit 41, a concealed evaluation value reception unit 42, a determination unit 43, and a signature transmission unit 22. The secret key storage unit 41 and the determination unit 43 are similar to the elements in the first exemplary embodiment.

In the third exemplary embodiment, the concealed evaluation value reception unit 42 receives not only the concealed evaluation value but also the signature generated by the signature generation unit 21 from the client 10. In the present example, the concealed evaluation value reception unit 42 receives the concealed evaluation value together with the signature from the client 10.

The signature transmission unit 22 included in the second server 40 transmits the signature (the signature generated by the signature generation unit 21 of the client 10) received by the concealed evaluation value reception unit 42 from the client 10 to the first server 30 under the condition that the determination unit 43 obtains the determination result that the biometric information X matches the biometric information Y.

In the third exemplary embodiment, the first server 30 includes a message transmission unit 31, a signature reception unit 32, a first verification key storage unit 33, and a signature determination unit 34. The message transmission unit 31 and the first verification key storage unit 33 are similar to the elements in the first exemplary embodiment.

In the third exemplary embodiment, the signature reception unit 31 receives the signature transmitted by the signature transmission unit 22 included in the second server 40.

The signature determination unit 34 determines whether or not the signature is a correct signature by using the first verification key puk, the message (the message corresponding to the challenge) transmitted to the client 10 by the message transmission unit 31, and the signature received from the second server 40 by the signature reception unit 32. In other words, the signature determination unit 34 determines whether or not the received signature is a signature generated by using the signature key suk paired with the first verification key puk based on this message. This operation is similar to the operation of the signature determination unit 34 in the first exemplary embodiment.

When both a condition that the signature is determined to be the correct signature and a condition that the determination result that the biometric information X matches the biometric information Y are satisfied, the signature determination unit 34 determines that the authentication of the person to be authenticated succeeds. When one or both of the above two conditions are not satisfied, the signature determination unit 34 determines that the authentication of the person to be authenticated fails. That is, in the third exemplary embodiment, it can be said that the signature determination unit 34 includes the authentication determination unit 37 in the second exemplary embodiment.

As described above, the signature transmission unit 22 transmits the signature to the first server 30 under the condition that the determination unit 43 obtains the determination result that the biometric information X matches the biometric information Y. Accordingly, a case where the signature reception unit 31 receives the signature means that the determination result that the biometric information X matches the biometric information Y is obtained. That is, the signature reception unit 31 receives the signature, and thus, the signature transmission unit 22 determines that the condition that the determination result that the biometric information X matches the biometric information Y is obtained is satisfied.

In the client 10, the concealed evaluation value transmission unit 17 and the message reception unit 19 are realized by, for example, a CPU of a computer that operates according to a client program and a communication interface of the computer. For example, the CPU may read the client program from a program recording medium such as a program storage device of the computer, and operate as the concealed evaluation value transmission unit 17 and the message reception unit 19 by using the communication interface according to this program. The concealing unit 13, the concealed evaluation value calculation unit 16, and the signature generation unit 21 are realized by, for example, the CPU of the computer that operates according to the client program. For example, the CPU reads the client program from the program recording medium as described above, and may operate as the concealing unit 13, the concealed evaluation value calculation unit 16, and the signature generation unit 21 according to this program. The public key storage unit 11, the concealed information storage unit 14, and the signature key storage unit 20 are realized by, for example, a storage device included in the computer that realizes the client 10.

In the second server 40, the concealed evaluation value reception unit 42 and the signature transmission unit 22 are realized by, for example, a CPU of a computer that operates according to a server program and a communication interface of the computer. For example, the CPU may read the server program from a program recording medium such as a program storage device of the computer, and operate as the concealed evaluation value reception unit 42 and the signature transmission unit 22 by using the communication interface according to this program. The determination unit 43 is realized by, for example, a CPU of a computer that operates according to a server program. For example, the CPU reads the server program from the program recording medium as described above, and may operate as the determination unit 43 according to this program. The secret key storage unit 41 is realized by, for example, a storage device included in the computer that realizes the second server 40.

In the first server 30, the message transmission unit 31 and the signature reception unit 32 are realized by, for example, a CPU of a computer that operates according to a server program and a communication interface of the computer. For example, the CPU may read a server program from a program recording medium such as a program storage device of the computer, and operate as the message transmission unit 31 and the signature reception unit 32 by using the communication interface according to this program. The signature determination unit 34 is realized by, for example, a CPU of a computer that operates according to a server program. For example, the CPU may read the server program from the program recording medium as described above and operate as the signature determination unit 34 according to this program. The first verification key storage unit 33 is realized by, for example, a storage device included in the computer that realizes the first server 30.

In the present exemplary embodiment, since the first server 30 and the second server 40 are different servers, the server program installed on the first server 30 and the server program installed on the second server 40 are different programs.

Figure 9:
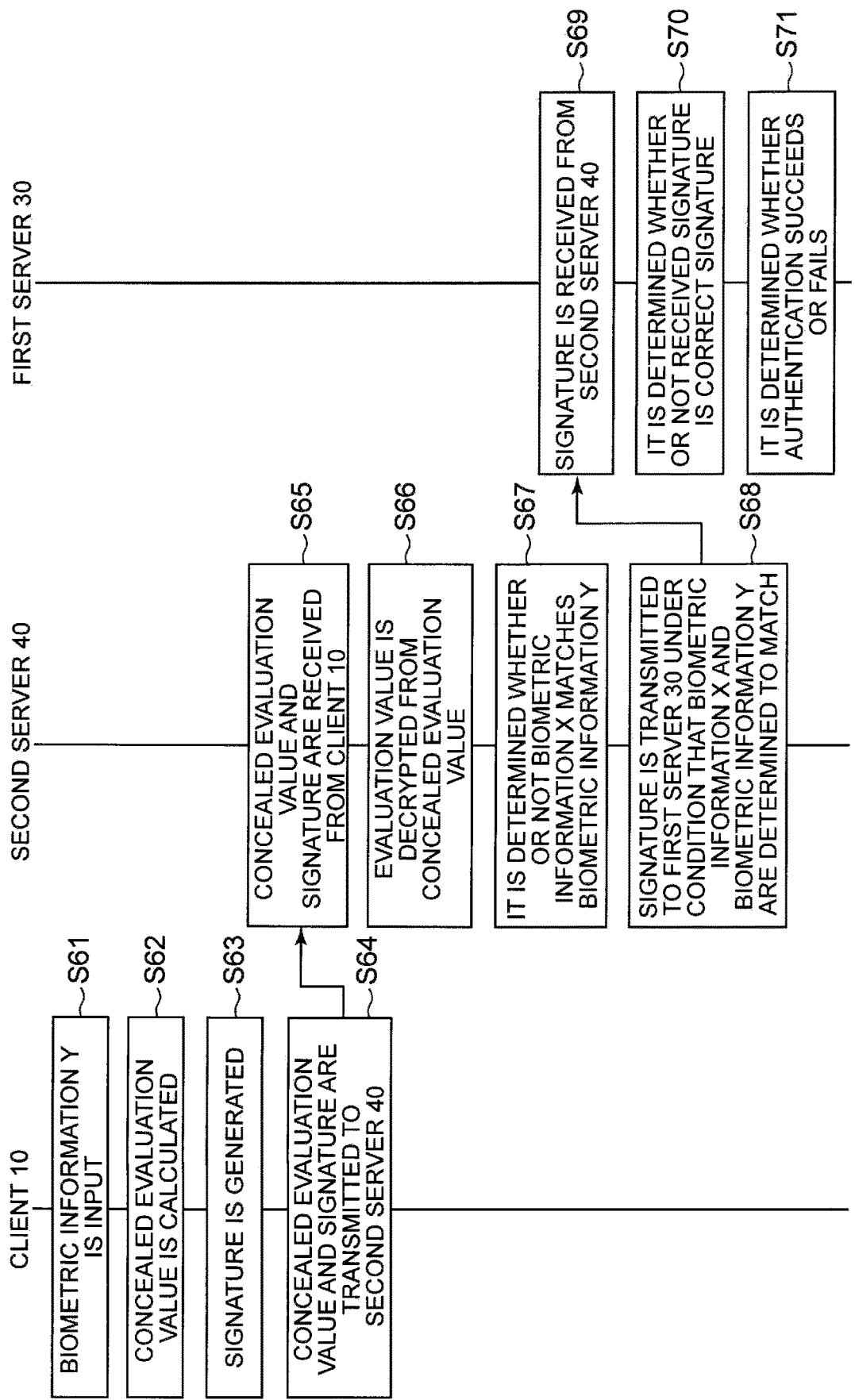
FIG. 9 It depicts a flowchart illustrating an example of a processing progress according to the third exemplary embodiment.

Next, a processing progress will be described. FIG. 9 is a flowchart illustrating an example of a processing progress according to the third exemplary embodiment. Detailed description of the matters already described will be omitted. In the present example, the message reception unit 19 already receives the message and retains the message.

First, the biometric information Y of the person to be authenticated is input to the matching information input unit 15 (step S61). The concealed evaluation value calculation unit 16 calculates the concealed evaluation value of the evaluation value indicating the similarity between the biometric information X and the biometric information Y based on the biometric information Y and the template stored in the concealed information storage unit 14 (step S62). Steps S61 and S62 are similar to steps S11 and S12 (see FIG. 4).

The signature generation unit 21 generates the signature by using the signature key suk based on the message received by the message reception unit 19 (step S63). Step S63 may be executed before step S61 or step S62.

Subsequently, the concealed evaluation value transmission unit 17 transmits the concealed evaluation value generated in step S62 and the signature generated in step S63 to the second sever 40 (step S64).

The concealed evaluation value reception unit 42 of the second server 40 receives the concealed evaluation value and the signature from the client 10 (step S65).

Subsequently, the determination unit 43 decrypts the evaluation value from the concealed evaluation value with the secret key sk (step S66). The determination unit 43 determines whether or not the biometric information X matches the biometric information Y by determining whether or not the evaluation value is a value within a predetermined range set in advance (step S67). Steps S66 and S67 are similar to steps S15 and S16 (see FIG. 4).

The signature transmission unit 22 transmits the signature received from the client 10 in step S65 to the first server 30 under the condition that the determination unit 43 obtains the determination result that the biometric information X matches the biometric information Y (step S68). When the determination result that the biometric information X does not match the biometric information Y is obtained in step S67, the processing in and after step S68 is not executed, and for example, the processing for the biometric information Y is ended at this time. At this time, the second server 40 may or may not notify the client 10 of the determination result.

The signature reception unit 32 of the first server 30 receives the signature transmitted in step S68 (step S69).

Subsequently, the signature determination unit 34 determine whether or not the signature is a correct signature by using the first verification key puk, the message transmitted to the client 10 by the message transmission unit 31, and the signature received from the second server 40 by the signature reception unit 32 (step S70).

The signature determination unit 34 determines whether the authentication succeeds or fails by determining whether or not both a condition that the signature is determined to be the correct signature and a condition that the determination result that the biometric information X matches the biometric information Y are satisfied (step S71). As described above, in the present exemplary embodiment, a case where the signature reception unit 31 receives the signature means that the determination result that the biometric information X matches the biometric information Y is obtained. Accordingly, the signature determination unit 34 may determine that the condition that the determination result that the biometric information X matches the biometric information Y is obtained is satisfied by confirming the completion of step S69. Thus, the signature determination unit 34 may determine that the authentication of the person to be authenticated succeeds when it is determined that the signature is the correct signature, and may determine that the authentication of the person to be authenticated fails when it is determined that the signature is the unauthorized signature.

In the present exemplary embodiment, the second server 40 transmits the signature generated in the client 10 to the first server 30 under the condition that the determination result that the biometric information X matches the biometric information Y is obtained. Accordingly, a case where the first server 30 receives the signature from the second server 40 means that the determination result that the biometric information X matches the biometric information Y is obtained. The signature determination unit 34 of the first server 30 determines that the authentication succeeds when it is determined that the received signature is the correct signature, and determines that the authentication fails when it is determined that the received signature is the unauthorized signature. Accordingly, when both a condition that the signature is determined to be the correct signature and a condition that the determination result that the biometric information X matches the biometric information Y are obtained are satisfied, it can be said that the authentication succeeds. Accordingly, effects similar to those of the first exemplary embodiment and the second exemplary embodiment are obtained. That is, even though malware or the like is incorporated in the client 10, it is possible to prevent the determination that the authentication of the person to be authenticated succeeds even though the determination as to whether the matching information matches the registration information is not performed.

The various modification examples of the first exemplary embodiment can also be appropriately applied to the third exemplary embodiment.

In each of the above exemplary embodiments, the concealed evaluation value calculation unit 16 may calculate pieces of concealed information corresponding to a plurality of types of items such as a fingerprint and a vein of a finger, and the determination unit 43 may determine whether or not the biometric information X matches the biometric information Y for each of the items. For example, in the first exemplary embodiment, when it is determined that X matches Y for all the items, the certificate generation unit 45 may individually generate the certificate for each of the items. The certificate determination unit 36 may determine whether or not the certificate is a correct certificate for each certificate.

Figure 10:
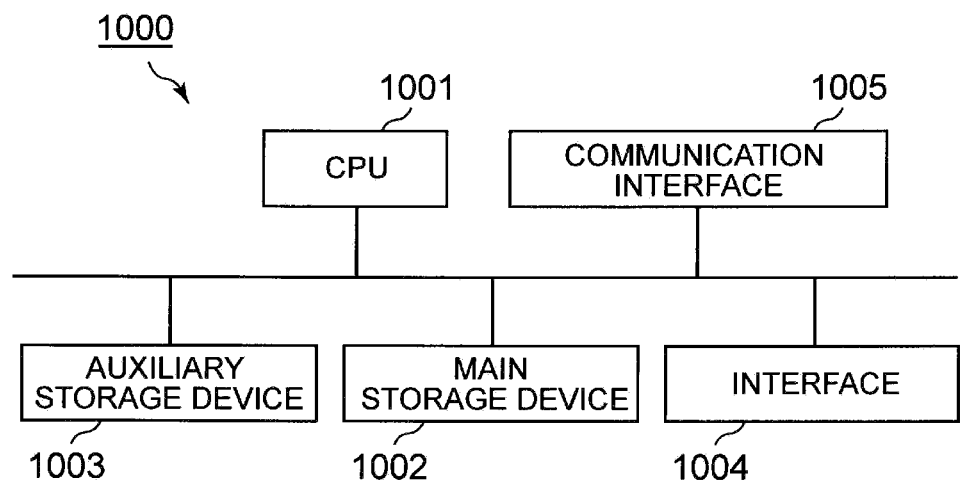
FIG. 10 It depicts a schematic block diagram illustrating a configuration example of a computer related to the client 10 and various servers in the exemplary embodiments and modification examples.

FIG. 10 is a schematic block diagram illustrating a configuration example of a computer according to the client 10 and various servers (the first server 30 and the second server 40 in the first exemplary embodiment and the third exemplary embodiment, and the server 50 in the second embodiment) in each of the above exemplary embodiments and modification examples. Hereinafter, as will be described with reference to FIG. 10, a computer used as the client 10, a computer used as the first server 30, and a computer used as the second server 40 are different computers. In the second exemplary embodiment, the computer used as the client 10 and the computer used as the server 50 are also separate computers.

A computer 1000 includes a CPU 1001, a main storage device 1002, an auxiliary storage device 1003, an interface 1004, and a communication interface 1005.

The client 10, the first server 30, the second server 40, or the server 50 in each of the exemplary embodiments of the present invention and the modification examples thereof are realized by the computer 1000. However, as described above, the computer used as the client 10, the computer used as the first server 30, the computer used as the second server 40, and the computer used as the server 50 are different computers.

An operation of the computer 1000 that realizes the client 10 is stored in the auxiliary storage device 1003 in the form of a client program. The CPU 1001 reads out the client program from the auxiliary storage device 1003, develops the client program in the main storage device 1002, and executes the operation of the client 10 described in each of the above exemplary embodiments according to the client program.

An operation of the computer 1000 that realizes the first server 30 is stored in the auxiliary storage device 1003 in the form of a server program. The CPU 1001 reads out the server program from the auxiliary storage device 1003, develops the server program in the main storage device 1002, and executes the operation of the first server 30 described in the first exemplary embodiment and the third exemplary embodiment according to the server program.

An operation of the computer 1000 that realizes the second server 40 is stored in the auxiliary storage device 1003 in the form of a server program. The CPU 1001 reads out the server program from the auxiliary storage device 1003, develops the server program in the main storage device 1002, and executes the operation of the second server 40 described in the first exemplary embodiment and the third exemplary embodiment according to the server program.

An operation of the computer 1000 that realizes the server 50 is stored in the auxiliary storage device 1003 in the form of a server program. The CPU 1001 reads out the server program from the auxiliary storage device 1003, develops the server program in the main storage device 1002, and executes the operation of the server 50 described in the second exemplary embodiment according to the server program.

The auxiliary storage device 1003 is an example of a non-transitory tangible medium. As another example of the non-transitory tangible medium, there are a magnetic disk, a magneto-optical disk, a compact disk read only memory (CD-ROM), a digital versatile disk read only memory (DVD-ROM), a semiconductor memory, and the like connected via the interface 1004.

When the program is distributed to the computer 1000 via a communication line, the computer 1000 to which the program is distributed may develop this program in the main storage device 1002 and operate according to this program.

A part or all of the constituent components of the client 10 may be realized by a general-purpose or dedicated circuitry, a processor, or a combination thereof. These constituent components may be realized by a single chip, or may be realized by a plurality of chips connected via a bus. A part or all of the constituent components may be realized by a combination of the above-described circuitry and the program. This point is similar in the first server 30, the second server 40, and the server 50.

Figure 11:
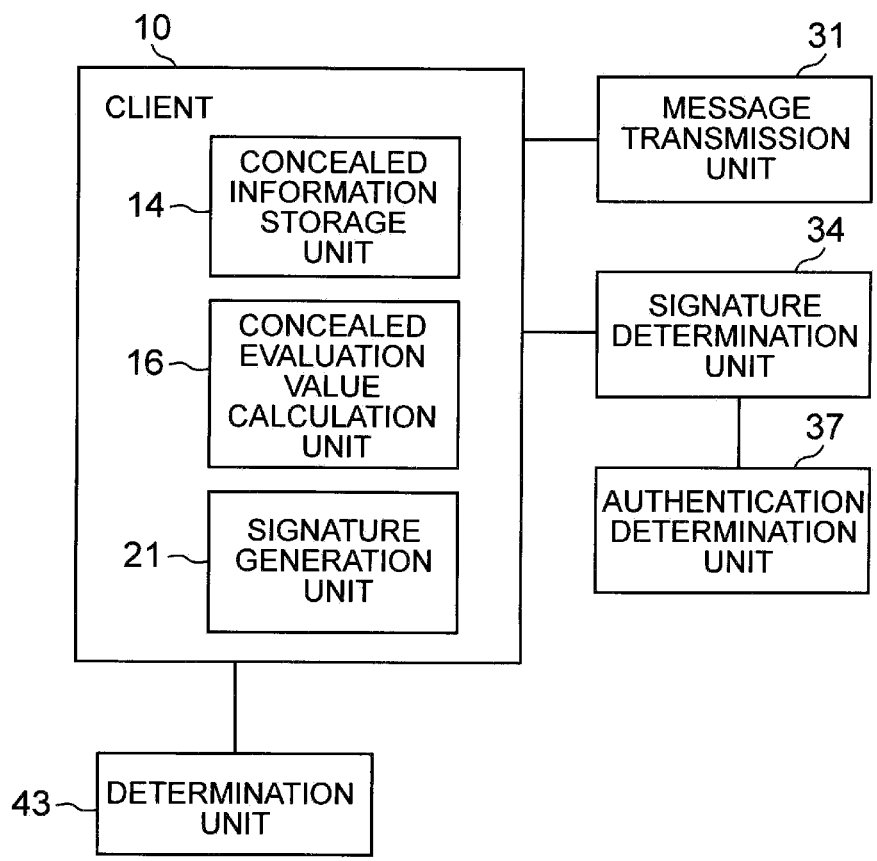
FIG. 11 It depicts a block diagram illustrating an outline of the authentication system according to the present invention.

Next, an outline of the present invention will be described. FIG. 11 is a block diagram illustrating an outline of the authentication system according to the present invention. The authentication system according to the present invention includes a determination unit 43, a message transmission unit 31, a signature determination unit 34, an authentication determination unit 37, and a client 10. The client 10 includes a concealed information storage unit 14, a concealed evaluation value calculation unit 16, and a signature generation unit 21.

The determination unit 43 determines whether or not the matching information matches the registration information based on the concealed evaluation value of the evaluation value indicating the similarity between the registration information and the matching information. The concealed evaluation value is calculated by the client 10.

The message transmission unit 31 transmits the message to the client 10.

The signature determination unit 34 determines whether or not the signature is a correct signature by using the first verification key, the message, and the signature generated in the client 10.

When it is determined that the matching information matches the registration information and it is determined that the signature is the correct signature, the authentication determination unit 37 determines that the authentication succeeds.

The concealed information storage unit 14 stores the concealed information obtained by concealing the registration information.

The concealed evaluation value calculation unit 16 calculates the concealed evaluation value based on the matching information and the concealed information.

The signature generation unit 21 generates the signature based on the message by using the signature key.

According to such a configuration, when it is determined that the matching information matches the registration information and it is determined that the signature is the correct signature, it is determined that the authentication succeeds. Accordingly, when the authentication using the two factors is performed, it is possible to prevent the determination that the authentication of the person to be authenticated succeeds even though the determination as to whether the matching information matches the registration information is not performed.

The above-described exemplary embodiments of the present invention can be described as, but not limited thereto, the following supplementary notes.

(Supplementary Note 1)

An authentication system including a client, the authentication system including a determination unit that determines whether or not matching information matches registration information based on a concealed evaluation value of an evaluation value indicating similarity between the registration information and the matching information, the concealed evaluation value being calculated by the client, a message transmission unit that transmits a message to the client, a signature determination unit that determines whether or not a signature is a correct signature by using a first verification key, the message, and the signature generated by the client and an authentication determination unit that determines that authentication succeeds when it is determined that the matching information matches the registration information and it is determined that the signature is the correct signature, in which the client includes a concealed information storage unit that stores concealed information obtained by concealing the registration information, a concealed evaluation value calculation unit that calculates the concealed evaluation value based on the matching information and the concealed information, and a signature generation unit that generates the signature based on the message by using a signature key.

(Supplementary Note 2)

The authentication system according to the supplementary note 1, further including a certificate generation unit that generates a certificate by using a certification key when it is determined that the matching information matches the registration information, and a certificate determination unit that determines whether or not the certificate is a correct certificate by using a second verification key and the certificate, in which the signature generation means generates the signature when it is determined that the matching information matches the registration information, and the authentication determination unit determines that authentication succeeds when it is determined that the certificate is the correct certificate and it is determined that the signature is the correct signature.

(Supplementary note 3)

The authentication system according to the supplementary note 2, in which the message transmission unit, the signature determination unit, the certificate determination unit, and the authentication determination unit are provided in a first server, and the determination unit and the certificate generation unit ae provided in a second server.

(Supplementary note 4)

The authentication system according to the supplementary note 2 or 3, in which the certificate determination unit acquires the certificate generated by the certificate generation unit via the client.

(Supplementary note 5)

The authentication system according to the supplementary note 3, in which the first server in which the certificate determination unit is provided directly acquires the certificate generated by the certificate generation unit from the second server in which the certificate generation unit is provided via a communication network.

(Supplementary note 6)

The authentication system according to any one of the supplementary notes 2 to 5, in which the certification key and the second verification key are common keys in a common key scheme.

(Supplementary note 7)

The authentication system according to the supplementary note 6, in which the certificate generation unit generates a set of a tag in a message authentication code and data used when the tag is generated as a certificate.

(Supplementary note 8)

The authentication system according to any one of the supplementary notes 2 to 5, in which the certification key is a secret key in a public key scheme, and the second verification key is a public key in the public key scheme.

(Supplementary note 9)

The authentication system according to the supplementary note 1, in which the determination unit, the message transmission unit, the signature determination unit, and the authentication determination unit are provided in one server, and the signature generation means generates the signature when it is determined that the matching information matches the registration information.

(Supplementary note 10)

The authentication system according to the supplementary note 1, in which the message transmission unit, the signature determination unit, and the authentication determination unit are provided in a first server, the determination unit is provided in a second server, and the second server includes a signature transmission unit that transmits the signature generated in the client to the first server under a condition that the matching information and the registration information are determined to match.

(Supplementary note 11)

A client including a concealed information storage unit that stores concealed information obtained by concealing registration information, a concealed evaluation value calculation unit that calculates a concealed evaluation value of an evaluation value indicating similarity between the registration information and the matching information based on matching information input for matching with the registration information and the concealed information, a signature generation unit that generates a signature based on a given message by using a signature key when a server determines that the matching information matches the registration information based on the concealed evaluation value, and a signature output unit that outputs a certificate generated by the server when the server determines that the matching information matches the registration information and the signature.

(Supplementary note 12)

A server including a determination unit that determines whether or not matching information matches registration information based on a concealed evaluation value of an evaluation value indicating similarity between the registration information and the matching information, the concealed evaluation value being calculated by a client, and a certificate generation unit that generates a certificate by using a certification key when it is determined that the matching information matches the registration information.

(Supplementary note 13)

A server including a message transmission unit that transmits a message to a client, a signature determination unit that acquires a signature generated by the client based on the message by using a signature key when it is determined that matching information matches registration information, and determines whether or not the signature is a correct signature by using a first verification key, the message, and the signature, a certificate determination unit that acquires a certificate generated by using a certification key when it is determined that the matching information matches the registration information, and determines whether or not the certificate is a correct certificate by using a second verification key and the certificate, and an authentication determination unit that determines that authentication succeeds when it is determined that the certificate is the correct certificate and it is determined that the signature is the correct signature.

(Supplementary note 14)

A server including a determination unit that determines whether or not matching information matches registration information based on a concealed evaluation value of an evaluation value indicating similarity between the registration information and the matching information, the concealed evaluation value being calculated by a client, a message transmission unit that transmits a message to the client, a signature determination unit that acquires a signature generated by the client based on the message by using a signature key when it is determined that the matching information matches the registration information, and determines whether or not the signature is a correct signature by using a verification key, the message, and the signature, and an authentication determination unit that determines that authentication succeeds when it is determined that the matching information matches the registration information and it is determined that the signature is the correct signature.

(Supplementary note 15)

A server including a determination unit that determines whether or not matching information matches registration information based on a concealed evaluation value of an evaluation value indicating similarity between the registration information and the matching information, the concealed evaluation value being calculated by a client, and a signature transmission unit that transmits a signature generated by the client based on a message given from a predetermined server to the predetermined server under a condition that the matching information and the registration information are determined to match.

(Supplementary note 16)

An authentication method including calculating, by a client that includes a concealed information storage unit storing concealed information obtained by concealing registration information, a concealed evaluation value of an evaluation value indicating similarity between the registration information and matching information based on matching information input for matching with the registration information and the concealed information, determining, by a predetermined server, whether or not the matching information matches the registration information based on the concealed evaluation value, transmitting, by the predetermined server or a server different from the predetermined server, a message to the client, generating, by the client, a signature based on the message by using a signature key when it is determined that the matching information matches the registration information, determining, by the predetermined server or the server different from the predetermined server, whether or not the signature is a correct signature by using a first verification key, the message, and the signature, and determining, by the predetermined server or the server different from the predetermined server, that authentication succeeds when it is determined that the matching information matches the registration information and it is determined that the signature is the correct signature.

(Supplementary note 17)

A client program installed on a computer that includes a concealed information storage unit storing concealed information obtained by concealing registration information and operates as a client, the client program causing the computer to execute concealed evaluation value calculation processing of calculating a concealed evaluation value of an evaluation value indicating similarity between the registration information and matching information based on the matching information input for matching with the registration information and the concealed information, signature generation processing of generating a signature based on a given message by using a signature key when a server determines that the matching information matches the registration information based on the concealed evaluation value, and signature output processing of outputting a certificate generated by the server when the server determines that the matching information matches the registration information and the signature.

(Supplementary note 18)

A server program installed on a computer operating as a server, the server program causing the computer to execute determination processing of determining whether or not matching information matches registration information based on a concealed evaluation value of an evaluation value indicating similarity between the registration information and the matching information, the concealed evaluation value being calculated by a client, and certificate generation processing of generating a certificate by using a certification key when it is determined that the matching information matches the registration information.

(Supplementary note 19)

A server program installed on a computer operating as a server, the server program causing the computer to execute transmission processing of transmitting a message to a client, signature determination processing of acquiring a signature generated by the client based on the message by using a signature key when it is determined that matching information matches registration information, and determining whether or not the signature is a correct signature by using a first verification key, the message, and the signature, certificate determination processing of acquiring a certificate generated by using a certification key when it is determined that the matching information matches the registration information, and determining whether or not the certificate is a correct certificate by using a second verification key and the certificate, and authentication determination processing of determining that authentication succeeds when it is determined that the certificate is the correct certificate and it is determined that the signature is the correct signature.

(Supplementary note 20)

A server program installed on a computer operating as a server, the server program causing the computer to execute determination processing of determining whether or not matching information matches registration information based on a concealed evaluation value of an evaluation value indicating similarity between the registration information and the matching information, the concealed evaluation value being calculated by a client, message transmission processing of transmitting a message to the client, signature determination processing of acquiring a signature generated by the client by using a signature key based on the message when it is determined that the matching information matches the registration information, and determining whether or not the signature is a correct signature by using a verification key, the message, and the signature, and authentication determination processing of determining that authentication succeeds when it is determined that the matching information matches the registration information and it is determined that the signature is the correct signature.

(Supplementary note 21)

A server program installed on a computer operating as a server, the server program causing the computer to execute determination processing of determining whether or not matching information matches registration information based on a concealed evaluation value of an evaluation value indicating similarity between the registration information and the matching information, the concealed evaluation value being calculated by a client, and signature transmission processing of transmitting a signature generated by the client based on a message given from a predetermined server to the predetermined server under a condition that the matching information and the registration information are determined to match.

Although the present invention has been described with reference to the exemplary embodiments, the present invention is not limited to the above-described exemplary embodiments. Various modifications that can be understood by those skilled in the art can be made to the configurations and details of the present invention within the scope of the present invention.

INDUSTRIAL APPLICABILITY

The present invention is suitably applied to the authentication system.

REFERENCE SIGNS LIST

10 Client
11 Public key storage unit
12 Registration information input unit
13 Concealing unit
14 Concealed information storage unit
15 Matching information input unit
16 Concealed evaluation value calculation unit
17 Concealed evaluation value transmission unit
18 Result reception unit
19 Message reception unit
20 Signature key storage unit
21 Signature generation unit
22 Signature transmission unit
30 First server
31 Message transmission unit
32 Signature reception unit
33 First verification key storage unit
34 Signature determination unit
35 Second verification key storage unit
36 Certificate determination unit
37 Authentication determination unit
40 Second server
41 Secret key storage unit
42 Concealed evaluation value reception unit
43 Determination unit
44 Certification key storage unit
45 Certificate generation unit
46 Result transmission unit
50 Server

What is claimed is:

1. An authentication system including a client, the authentication system comprising:
a second server that determines whether or not matching information matches registration information based on a concealed evaluation value of an evaluation value indicating similarity between the registration information and the matching information, the concealed evaluation value being calculated by the client;
a a first server that:
transmits a message to the client;
determines whether or not a signature is a correct signature by using a first verification key, the message, and the signature generated by the client; and
determines that authentication succeeds when the matching information matches the registration information and it is determined that the signature is the correct signature,
wherein the client
stores concealed information obtained by concealing the registration information;
calculates the concealed evaluation value based on the matching information and the concealed information; and
generates the signature based on the message by using a signature key,
wherein the second server further transmits the signature generated in the client to the first server under a condition that the matching information and the registration information are determined to match.

2. The authentication system according to claim 1,
wherein the second server further generates a certificate by using a certification key when the matching information matches the registration information,
wherein the first server further determines whether or not the certificate is a correct certificate by using a second verification key and the certificate,
wherein the client generates the signature when the matching information matches the registration information, and
wherein the first server unit determines that the authentication succeeds when the certificate is the correct certificate and the signature is the correct signature.

3. The authentication system according to claim 2, wherein the first server acquires the certificate via the client.

4. The authentication system according to claim 2, wherein the first server directly acquires the certificate from the second server via a communication network.

5. The authentication system according to claim 2, wherein the certification key and the second verification key are common keys in a common key scheme.

6. The authentication system according to claim 5, wherein the second server generates a set of a tag in a message authentication code and data used when the tag is generated as the certificate.

7. The authentication system according to claim 2, wherein the certification key is a secret key in a public key scheme, and the second verification key is a public key in the public key scheme.

8. A server comprising:
- a processor; and
- a memory storing instructions executable by the processor to:
  - determine whether or not matching information matches registration information based on a concealed evaluation value of an evaluation value indicating similarity between the registration information and the matching information, the concealed evaluation value being calculated by a client; and
- transmit a signature generated by the client based on a message given from a predetermined server to the predetermined server under a condition that the matching information and the registration information are determined to match.

* * * * *